(12) United States Patent
Zupancich et al.

(10) Patent No.: US 7,748,172 B2
(45) Date of Patent: Jul. 6, 2010

(54) INSULATED CARGO CONTAINERS

(75) Inventors: Ronald J. Zupancich, Clayton, NC (US); Joseph A. Seiter, Raleigh, NC (US)

(73) Assignee: Martin Marietta Materials, IInc., Raleigh, NC (US)

( * ) Notice: Subject to any disclaimer, the term of this patent is extended or adjusted under 35 U.S.C. 154(b) by 733 days.

(21) Appl. No.: 10/545,235

(22) PCT Filed: Feb. 13, 2004

(86) PCT No.: PCT/US2004/004365

§ 371 (c)(1),
(2), (4) Date: Jul. 21, 2006

(87) PCT Pub. No.: WO2004/071885

PCT Pub. Date: Aug. 26, 2004

(65) Prior Publication Data

US 2007/0034110 A1 Feb. 15, 2007

Related U.S. Application Data

(60) Provisional application No. 60/447,002, filed on Feb. 13, 2003.

(51) Int. Cl.
*B61D 17/12* (2006.01)
(52) U.S. Cl. .................... 52/55; 52/782.1; 105/355
(58) Field of Classification Search .............. 52/45–56, 52/474, 479, 506.06, 782.1, 782.11, 800.12; 105/355, 396, 404, 409, 423; 220/1.5, 62.11, 220/592.26

See application file for complete search history.

(56) References Cited

U.S. PATENT DOCUMENTS

| 739,800 | A | 9/1903 | Adams |
| 905,000 | A | 11/1908 | Roberts |
| 1,127,451 | A | 2/1915 | Knoch |
| 1,269,663 | A | 6/1918 | Wappler |
| 2,612,659 | A | 10/1952 | O'Connor et al. |
| 3,133,658 | A | 5/1964 | Freudman |
| 3,175,520 | A | 3/1965 | Talmey |

(Continued)

FOREIGN PATENT DOCUMENTS

EP 0 006 443 A1 9/1980

(Continued)

OTHER PUBLICATIONS

"Qualification Testing of Portland's Low Floor Light Rail Vehicle", Porter, D.L. et al., Proceedings of the 1997 IEEE/ASME Joint Railroad Conference, p. 221-35 (1997).

(Continued)

*Primary Examiner*—Richard E Chilcot, Jr.
*Assistant Examiner*—William V Gilbert
(74) *Attorney, Agent, or Firm*—Finnegan, Henderson, Farabow, Garrett & Dunner, L.L.P.

(57) ABSTRACT

The present invention relates to an insulated cargo container that may have, in combination, an interior panel covering a layer of thermal insulation that has an air-impermeable layer thereon. The thermal insulation is attached to the exterior panel of the container, which may have structural supports on its interior surface. In one embodiment, the insulated cargo container is an insulated railroad boxcar.

19 Claims, 29 Drawing Sheets

U.S. PATENT DOCUMENTS

| | | |
|---|---|---|
| 3,711,148 A | 1/1973 | Hindin |
| 3,715,846 A | 2/1973 | Sullhofer |
| 3,739,526 A | 6/1973 | Nelson |
| 3,790,243 A | 2/1974 | Whorton |
| 3,797,190 A | 3/1974 | Widdowson |
| 3,802,591 A | 4/1974 | Mizushima, et al. |
| 3,880,415 A | 4/1975 | Fujioka et al. |
| 3,962,015 A | 6/1976 | Heimann |
| 3,974,781 A | 8/1976 | Josephson |
| 3,993,811 A | 11/1976 | Walles |
| 4,049,311 A | 9/1977 | Dietrich et al. |
| 4,057,170 A | 11/1977 | Dougherty |
| 4,078,395 A | 3/1978 | Crowe et al. |
| 4,091,743 A | 5/1978 | Lemon |
| 4,151,802 A | 5/1979 | Miller et al. |
| 4,206,784 A | 6/1980 | Phillips |
| 4,221,421 A | 9/1980 | Bettker, Jr. et al. |
| 4,239,008 A | 12/1980 | Conlon |
| 4,263,751 A | 4/1981 | Bennett et al. |
| 4,296,692 A | 10/1981 | Roux |
| 4,302,913 A | 12/1981 | Schwartz et al. |
| 4,310,192 A | 1/1982 | Fitzgerald |
| 4,344,299 A | 8/1982 | Latzer |
| 4,357,048 A | 11/1982 | Zehnder et al. |
| 4,406,131 A | 9/1983 | Weasel, Jr. |
| 4,434,623 A | 3/1984 | Weasel, Jr. |
| 4,448,041 A | 5/1984 | Southworth, Jr. |
| 4,454,723 A | 6/1984 | Weasel, Jr. |
| 4,455,806 A | 6/1984 | Rice |
| 4,498,418 A | 2/1985 | Chumley |
| 4,569,292 A | 2/1986 | Dunham et al. |
| 4,570,396 A | 2/1986 | Struben |
| 4,631,891 A | 12/1986 | Donavich |
| 4,646,934 A | 3/1987 | McAllister |
| 4,682,458 A | 7/1987 | Sparrow |
| 4,704,876 A | 11/1987 | Hill |
| 4,763,452 A | 8/1988 | Harvey |
| 4,778,078 A | 10/1988 | McAllister |
| 4,791,768 A | 12/1988 | Crean |
| 4,854,460 A | 8/1989 | Josephs |
| 4,884,496 A | 12/1989 | Donavich |
| 4,887,437 A | 12/1989 | Fenton et al. |
| 4,891,954 A | 1/1990 | Thomsen |
| 4,918,895 A | 4/1990 | Landheer |
| 4,958,472 A | 9/1990 | Ehrlich |
| 5,010,943 A | 4/1991 | Boyer |
| 5,011,729 A | 4/1991 | McAllister |
| 5,016,395 A | 5/1991 | Walker et al. |
| 5,016,408 A | 5/1991 | Brillinger et al. |
| 5,054,402 A | 10/1991 | Brassell |
| 5,054,843 A | 10/1991 | Gray |
| 5,168,717 A | 12/1992 | Mowatt-Larssen |
| 5,170,605 A | 12/1992 | Huddle |
| 5,265,748 A | 11/1993 | Furukawa |
| 5,285,604 A | 2/1994 | Carlin |
| 5,316,171 A | 5/1994 | Danner, Jr. et al. |
| 5,330,816 A * | 7/1994 | Rusek, Jr. .................... 428/69 |
| 5,351,990 A | 10/1994 | Thomas |
| 5,403,063 A | 4/1995 | Sjostedt et al. |
| 5,473,901 A | 12/1995 | Roseen |
| 5,476,318 A | 12/1995 | Yingst et al. |
| 5,500,305 A | 3/1996 | Bridges et al. |
| 5,507,405 A | 4/1996 | Thomas et al. |
| 5,512,345 A | 4/1996 | Tsutsumi et al. |
| 5,584,188 A | 12/1996 | Tippmann et al. |
| 5,601,201 A | 2/1997 | Looker |
| 5,660,057 A | 8/1997 | Tyree, Jr. |
| 5,664,396 A | 9/1997 | Lyman et al. |
| 5,671,609 A | 9/1997 | Lionetti |
| 5,711,073 A | 1/1998 | Tippmann et al. |
| 5,756,179 A * | 5/1998 | Jutte ......................... 428/69 |
| 5,765,485 A | 6/1998 | Thoman et al. |
| 5,772,276 A | 6/1998 | Fetz et al. |
| 5,784,970 A | 7/1998 | Fehr et al. |
| 5,788,595 A | 8/1998 | Beck |
| 5,795,639 A | 8/1998 | Lin |
| 5,797,646 A | 8/1998 | Jeunehomme et al. |
| 5,802,984 A | 9/1998 | Thoman et al. |
| 5,855,174 A | 1/1999 | Thoman et al. |
| 5,857,414 A | 1/1999 | Thoman et al. |
| 5,890,435 A | 4/1999 | Thoman et al. |
| 5,900,299 A | 5/1999 | Wynne |
| 5,916,093 A | 6/1999 | Fecko et al. |
| 5,927,090 A | 7/1999 | Ladendorf et al. |
| 5,934,741 A | 8/1999 | Beukers et al. |
| 5,938,274 A | 8/1999 | Ehrlich |
| 5,947,812 A | 9/1999 | Henning et al. |
| 5,979,173 A | 11/1999 | Tyree |
| 5,979,684 A * | 11/1999 | Ohnishi et al. ............... 220/1.5 |
| 5,987,910 A | 11/1999 | Kothe et al. |
| 5,988,074 A | 11/1999 | Thoman |
| 5,992,117 A | 11/1999 | Schmidt |
| 6,000,342 A | 12/1999 | Thoman et al. |
| 6,010,020 A | 1/2000 | Abal |
| 6,037,033 A | 3/2000 | Hunter |
| 6,092,472 A | 7/2000 | Thoman et al. |
| 6,119,422 A | 9/2000 | Clear et al. |
| 6,132,307 A | 10/2000 | Wills |
| 6,138,580 A * | 10/2000 | Thoman .................... 105/396 |
| 6,164,085 A | 12/2000 | Clarke et al. |
| 6,199,939 B1 | 3/2001 | Ehrlich |
| 6,220,651 B1 | 4/2001 | Ehrlich |
| 6,224,142 B1 | 5/2001 | McCormack |
| 6,244,458 B1 | 6/2001 | Frysinger et al. |
| 6,266,972 B1 | 7/2001 | Bostic |
| 6,269,652 B1 | 8/2001 | Grosskopf |
| 6,349,988 B1 | 2/2002 | Foster et al. |
| 6,367,391 B1 | 4/2002 | Thoman et al. |
| 6,374,546 B1 | 4/2002 | Fecko et al. |
| 6,381,966 B1 | 5/2002 | Barrow |
| 6,381,981 B1 | 5/2002 | Yaddgo et al. |
| 6,397,620 B1 | 6/2002 | Kelly et al. |
| 6,454,345 B1 | 9/2002 | Campus |
| 6,503,037 B2 | 1/2003 | Thomson et al. |
| 6,505,883 B1 | 1/2003 | Ehrlich |
| 6,550,255 B2 | 4/2003 | Rudick et al. |
| 6,575,102 B2 | 6/2003 | Norton et al. |
| 6,615,741 B2 | 9/2003 | Fecko et al. |
| 6,623,413 B1 | 9/2003 | Wynne |
| 6,722,287 B2 | 4/2004 | Norton et al. |
| 6,892,433 B2 | 5/2005 | Barry et al. |
| 6,904,848 B2 | 6/2005 | Norton et al. |
| 7,001,005 B2 * | 2/2006 | Gamberoni et al. ......... 312/400 |
| 7,004,080 B2 | 2/2006 | Creighton et al. |
| 7,228,805 B2 | 6/2007 | Beers |
| 7,305,923 B2 | 12/2007 | Creighton et al. |
| 2001/0011832 A1 | 8/2001 | Ehrlich et al. |
| 2002/0020129 A1 | 2/2002 | Winter |
| 2002/0062611 A1 | 5/2002 | Pryor et al. |
| 2002/0114937 A1 | 8/2002 | Albert et al. |
| 2002/0134088 A1 | 9/2002 | Rudick et al. |
| 2002/0144482 A1 | 10/2002 | Henson et al. |
| 2002/0148181 A1 | 10/2002 | Friesner |
| 2002/0148196 A1 | 10/2002 | Barry et al. |
| 2002/0148381 A1 | 10/2002 | Norton et al. |
| 2002/0157565 A1 | 10/2002 | Norton et al. |
| 2002/0170238 A1 | 11/2002 | Fecko et al. |
| 2002/0185880 A1 | 12/2002 | Miller |
| 2003/0041981 A1 | 3/2003 | Cramer, III |
| 2003/0056456 A1 | 3/2003 | Heydon |
| 2003/0159404 A1 | 8/2003 | Chang |
| 2003/0203149 A1 | 10/2003 | Allen et al. |
| 2004/0020236 A1 | 2/2004 | Vince, II et al. |
| 2005/0098060 A1 | 5/2005 | Bigda et al. |

| | | | | | | |
|---|---|---|---|---|---|---|
| 2005/0194381 | A1 | 9/2005 | Zupancich et al. | JP | 2002-264717 | 9/2002 |
| 2005/0252164 | A1 | 11/2005 | Zupancich et al. | WO | WO99/10220 | 3/1999 |
| 2005/0252913 | A1 | 11/2005 | Zupancich et al. | WO | WO99/12787 | 3/1999 |
| 2006/0065152 | A1 | 3/2006 | Heitmeyer et al. | WO | WO 0006443 | 2/2000 |

FOREIGN PATENT DOCUMENTS

| | | |
|---|---|---|
| EP | 0 052 982 A2 | 6/1982 |
| EP | 0 075 913 A2 | 4/1983 |
| EP | 0 375 621 A1 | 12/1989 |
| EP | 0 358 638 B1 | 3/1990 |
| EP | 0 490 073 B1 | 12/1990 |
| EP | 0 463 980 B1 | 1/1992 |
| EP | 0 514 014 B1 | 11/1992 |
| EP | 0 554 361 B1 | 6/1993 |
| EP | 0 589 033 B1 | 3/1994 |
| EP | 0 739 800 A1 | 10/1996 |
| EP | 0 753 422 B1 | 1/1997 |
| EP | 0 904 228 B1 | 3/1999 |
| EP | 0 905 000 A1 | 3/1999 |
| EP | 0 330 293 A2 | 8/1999 |
| EP | 0 962 343 A2 | 12/1999 |
| EP | 0 967 116 A2 | 12/1999 |
| EP | 1 219 484 A2 | 7/2002 |
| EP | 1 288 112 A1 | 3/2003 |
| JP | 55135294 | 10/1980 |
| JP | 1127451 | 5/1989 |
| JP | 1269663 | 10/1989 |
| JP | 9048369 | 2/1997 |
| JP | 10-147262 | 6/1998 |
| JP | 10-258777 | 9/1998 |
| JP | 10-258779 | 9/1998 |
| JP | 10258778 | 9/1998 |
| JP | 11-210106 | 8/1999 |
| JP | 2000-052982 | 2/2000 |
| JP | 2000-081266 | 3/2000 |
| JP | 2001263897 | 9/2001 |

OTHER PUBLICATIONS

"Fiberglass Reinforced Foam Core Sandwich Panel for Use as Refrigerated Semi-Trailer Side Walls and Roofs", Edford, Allan S., SAE Technical Papers, 820991, (1982).
U.S. Appl. No. 10/957,729, filed Oct. 5, 2004, Seiter.
International Search Report for PCT/US/04/04365 dated Aug. 19, 2008.
"Vacuum Bagging", http://www.info-central.org/construction_vacuumbagging.shtml, Wayback Machine, Dec. 4, 1999, p. 1, Lines 23-27.
Milstein, Michael. "Specially Designed Boat Gets Geologists into Hot Water". The San Diego Union-Tribune. Aug. 24, 1994, p. E1, Abstract, Line 2.
"The Meaning of R and Other Useful Facts of Insulation". Chicago Sun-Times. Sep. 22, 1989, p. 11. Full Text, Lines 56-58, 65.
Office Action Dated Jan. 30, 2007 in U.S. Appl. No. 10/957,729.
Office Action Dated Jul. 26, 2007 in U.S. Appl. No. 10/957,729.
Notice of Allowance Dated Nov. 20, 2007 in U.S. Appl. No. 10/957,729.
Office Action Dated Aug. 8, 2007 in U.S. Appl. No. 11/072,293.
Office Action Dated Jan. 4, 2008 in U.S. Appl. No. 11/072,293.
Office Action Dated Nov. 25, 2008 in U.S. Appl. No. 11/150,310.
Notice of Allowance Dated Jun. 1, 2009 in U.S. Appl. No. 11/150,310.
Office Action Dated May 23, 2007 in U.S. Appl. No. 11/104,089.
Office Action Dated Oct. 18, 2007 in U.S. Appl. No. 11/104,089.
Notice of Allowance Dated Jun. 5, 2008 in U.S. Appl. No. 11/104,089.
Office Action Dated Apr. 16, 2008 in U.S. Appl. No. 11/246,221.

* cited by examiner

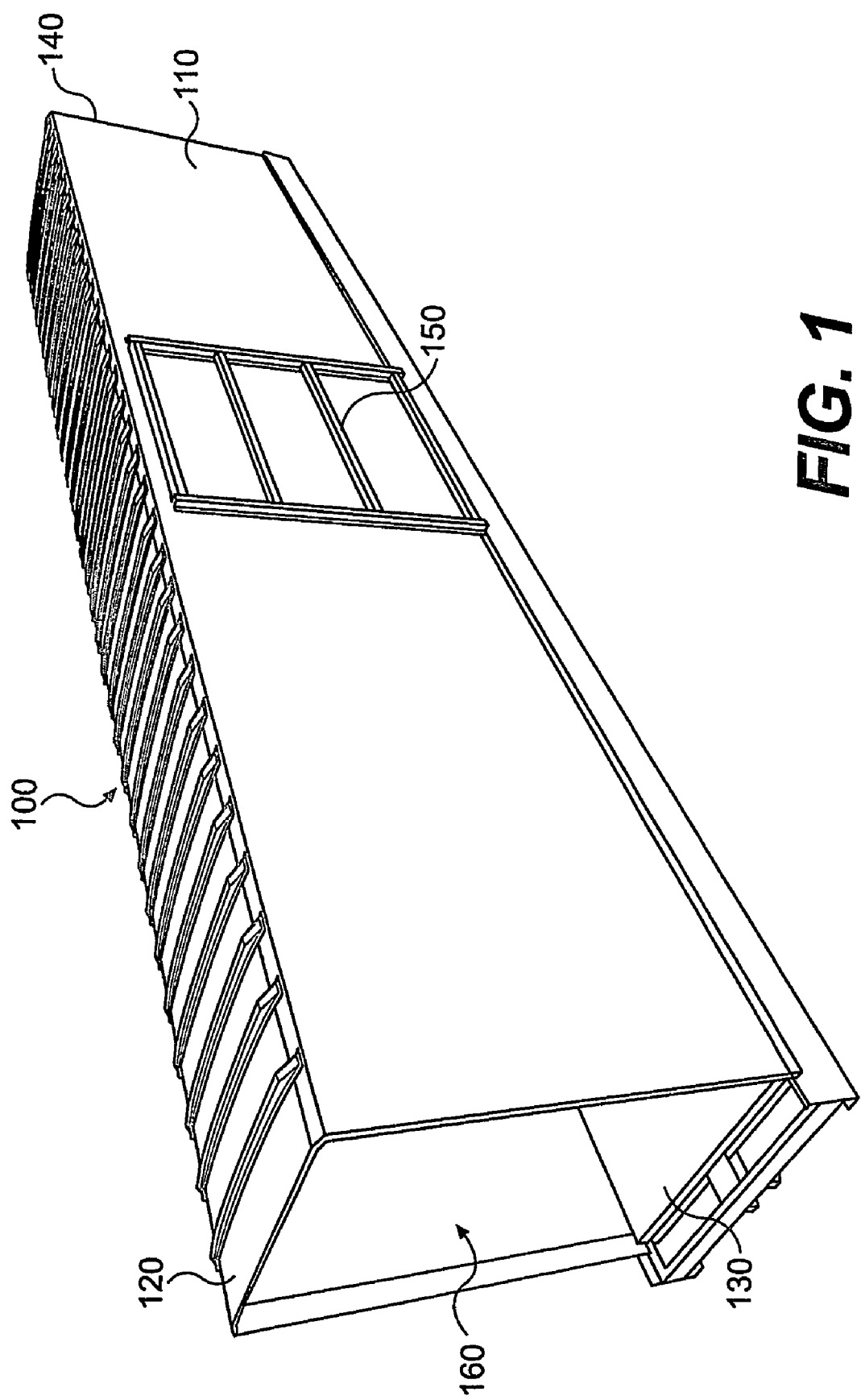

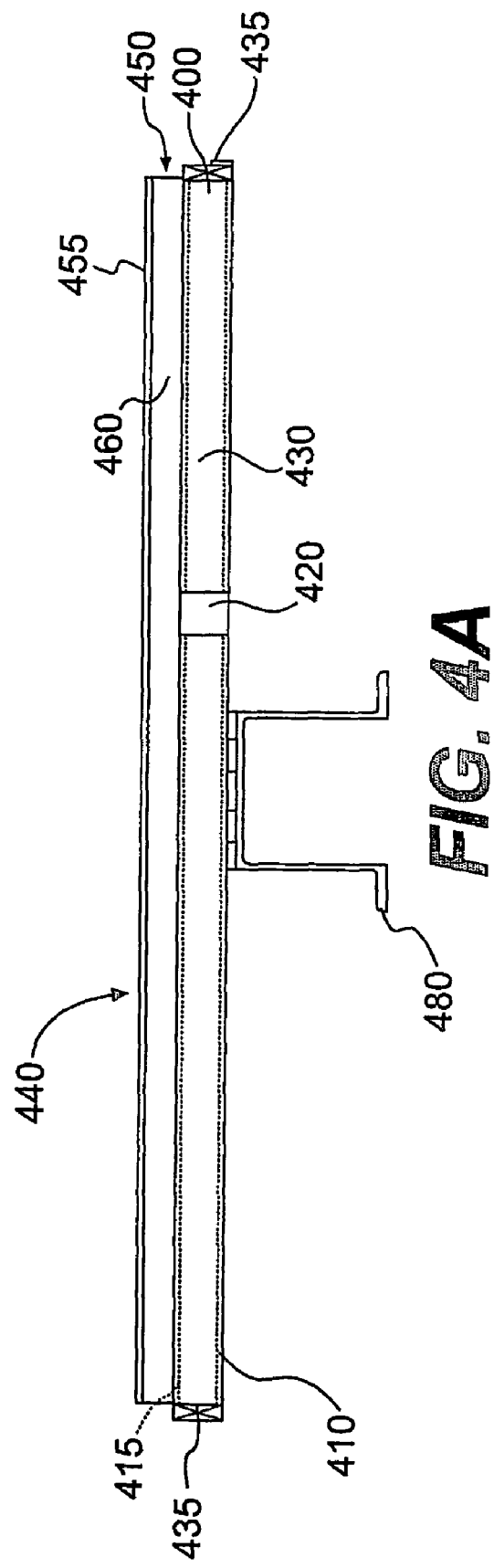

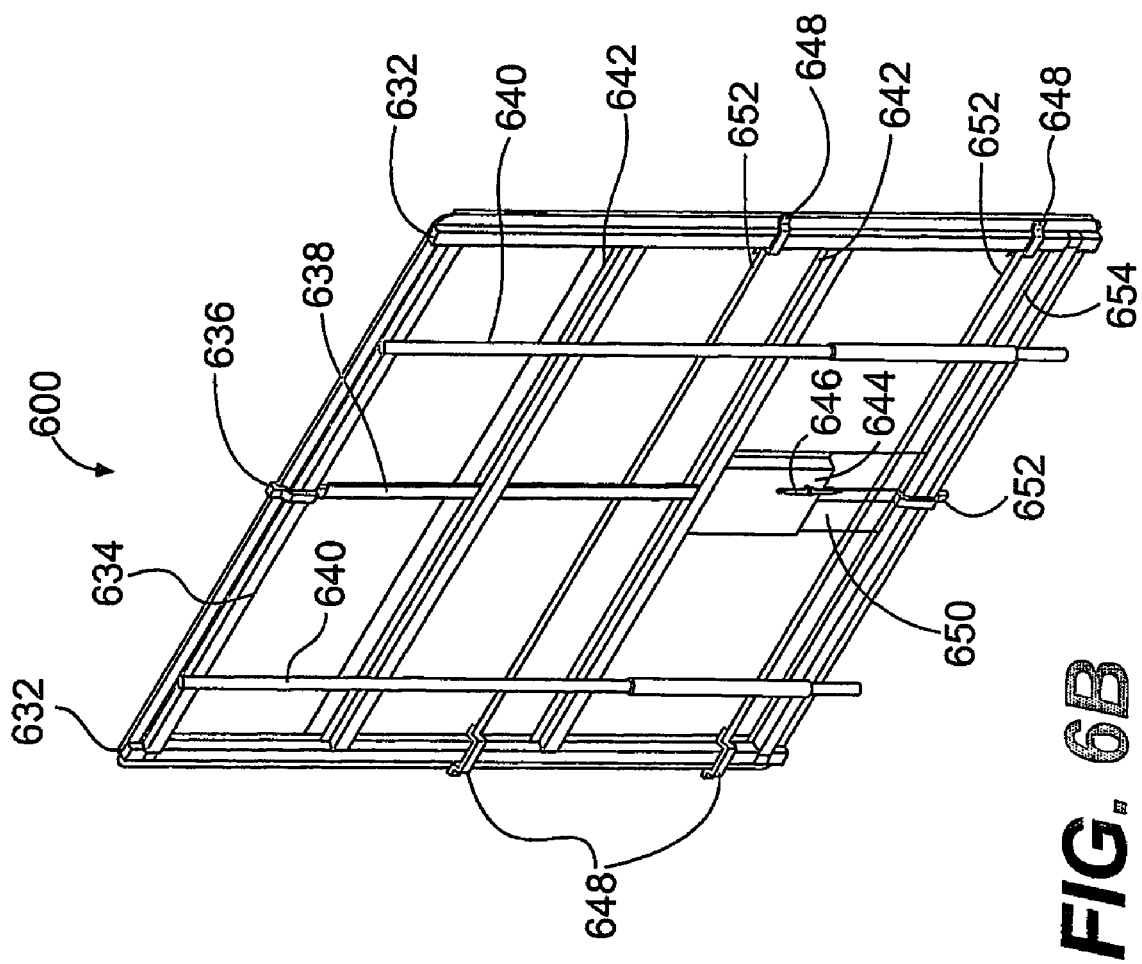

INSULATED CARGO CONTAINERS

I. CROSS-REFERENCE TO RELATED APPLICATION

This application claims the benefit of U.S. Provisional Application No. 60/447,002, filed Feb. 13, 2003, by Ron Zupancich, Joe Seiter, and Grant Godwin, and titled COMPOSITE RAIL CAR, COMPOSITE RAIL CAR DOOR AND METHODS OF MANUFACTURE THEREOF, the disclosure of which is expressly incorporated herein by reference.

II. BACKGROUND

A. Technical Field

The present invention relates to an insulated cargo container. In one embodiment, the insulated cargo container is an insulated railroad boxcar.

B. Related Art

Currently, many shippers utilize refrigerated and/or insulated large cargo containers (such as boxcars) to transport items that require the maintenance of specified temperatures during transit. Because these containers are required to maintain certain temperatures, the thermal efficiency of these containers is an important feature. Thermal efficiency is characterized by the thermal conductivity of a particular component or its inverse, its resistance to heat transfer, commonly referred to as an R-value.

The majority of heat loss through these containers occurs through the sidewalls, end walls, doors, roofs, and underframes. Typically, these components are constructed of steel. If the container is a boxcar, it usually has several steel posts on the interior of the car. In order to insulate the cars, wood risers are installed in the side walls, floor, roof, and end walls and between the interior steel posts. Panels of plastic foam, such as urethane, are then placed in the spaces around the wood risers. A liner is then placed over the wood and foam structure. Components of this construction typically possess an R-Value of approximately 6 per inch of foam. More recently, some cargo containers have been constructed from composites in addition to steel and wood, but utilizing similar insulating materials.

Cargo containers of this construction, however, suffer from several drawbacks. In order to adequately insulate the car, a large thickness of wood and foam insulation must be used. This, however, significantly narrows the interior dimensions of the car thereby reducing the amount of cargo that the container can hold. In addition, even with this significant thickness, the thermal efficiency of the container is not as high as would be desired.

Therefore, there is a need for an insulated and refrigerated cargo container having a high insulation value without significantly reducing the interior dimensions of the car.

In addition to including insulation, current cargo containers often include a plenum located on the interior surface of its roof. The plenum allows for air-flow over the roof, which improves the temperature distribution in the cargo container. Typically, the plenums include metallic supports on either longitudinal end of the container and are supported by hangers. Plenums of this design, however may incur damage to the supports caused by impacts due to forklift trucks or pulling out of fasteners.

Therefore, there is a need for a roof plenum design that will be resistant to impact due to forklift trucks or pulling out of fasteners.

III. SUMMARY

An apparatus consistent with the present invention provides an insulated wall panel for a cargo container. The container includes an exterior panel having an interior surface. The container has at least one structural member attached to the interior surface of the exterior panel. At least one vacuum insulated panel, having an exterior and interior surface, has its exterior surface attached to the interior surface of the exterior panel. The vacuum insulated panel is comprised of an evacuated porous insulating material; and an air impermeable layer encapsulating the porous insulating material. The container further includes an interior panel having an exterior surface attached to the interior surface of the vacuum insulated panel. The interior panel and exterior panel form a closed structure surrounding at least one vacuum insulated panel.

Additional aspects of the invention are disclosed and defined by the appended claims. It is to be understood that both the foregoing general description and the following detailed description are exemplary and explanatory only and are not restrictive of the invention as claimed.

IV. BRIEF DESCRIPTION OF THE DRAWINGS

The accompanying drawings, which are incorporated in and constitute a part of this specification, illustrate several embodiments of the invention and, together with the following description, serve to explain the principles of the invention.

In the drawings:

FIG. 1 is an isometric view of an insulated or refrigerated boxcar consistent with one embodiment of the invention;

FIG. 4A is a front view of an insulated floor system consistent with one embodiment of the invention;

FIG. 6B is a front isometric view of an insulated door panel consistent with one embodiment of the invention;

V. DESCRIPTION OF THE EMBODIMENTS

A. Introduction

Figure 2A:
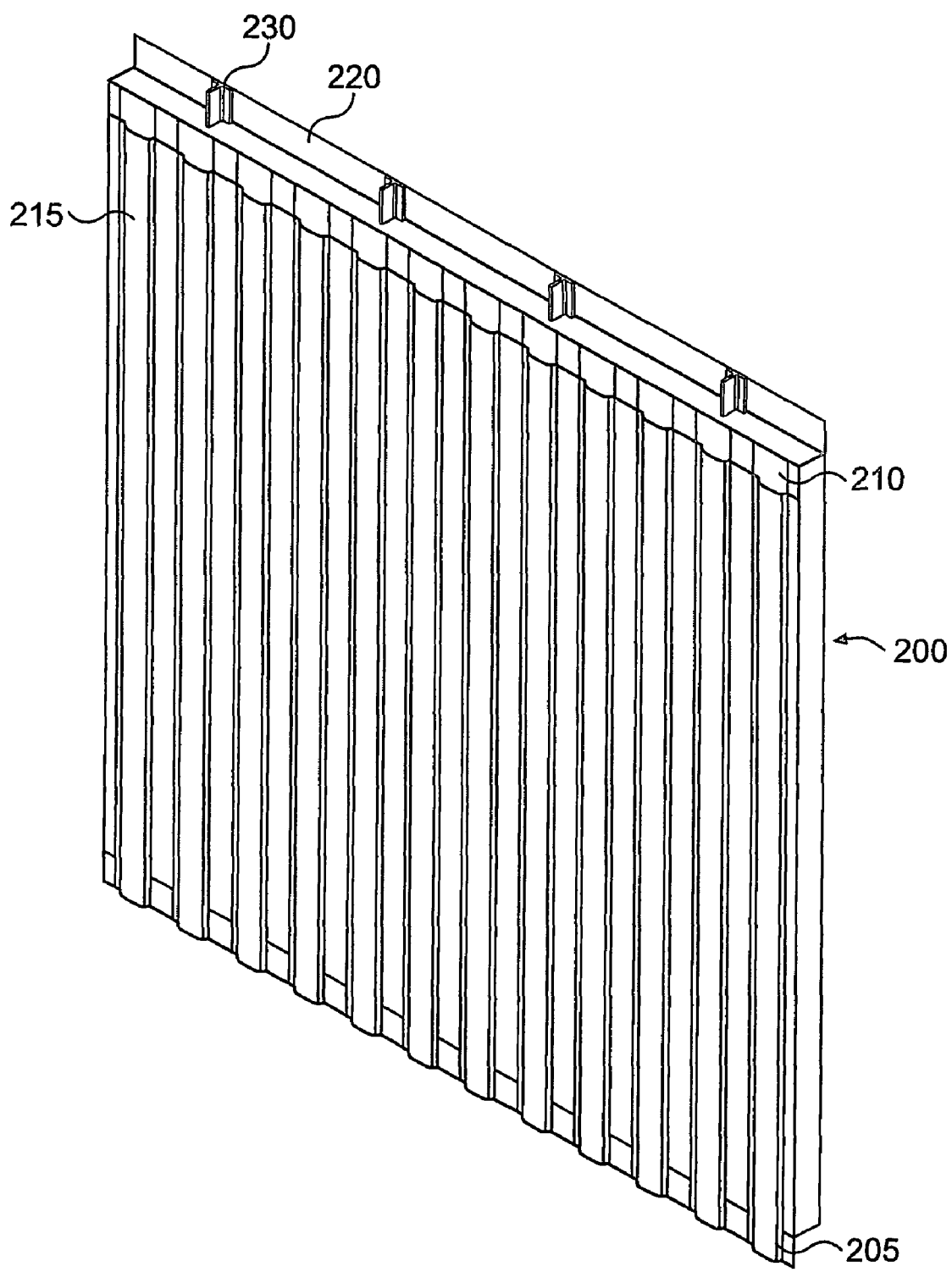
FIG. 2A is an isometric view of an insulated wall panel consistent with one embodiment of the invention.
Figure 2B:
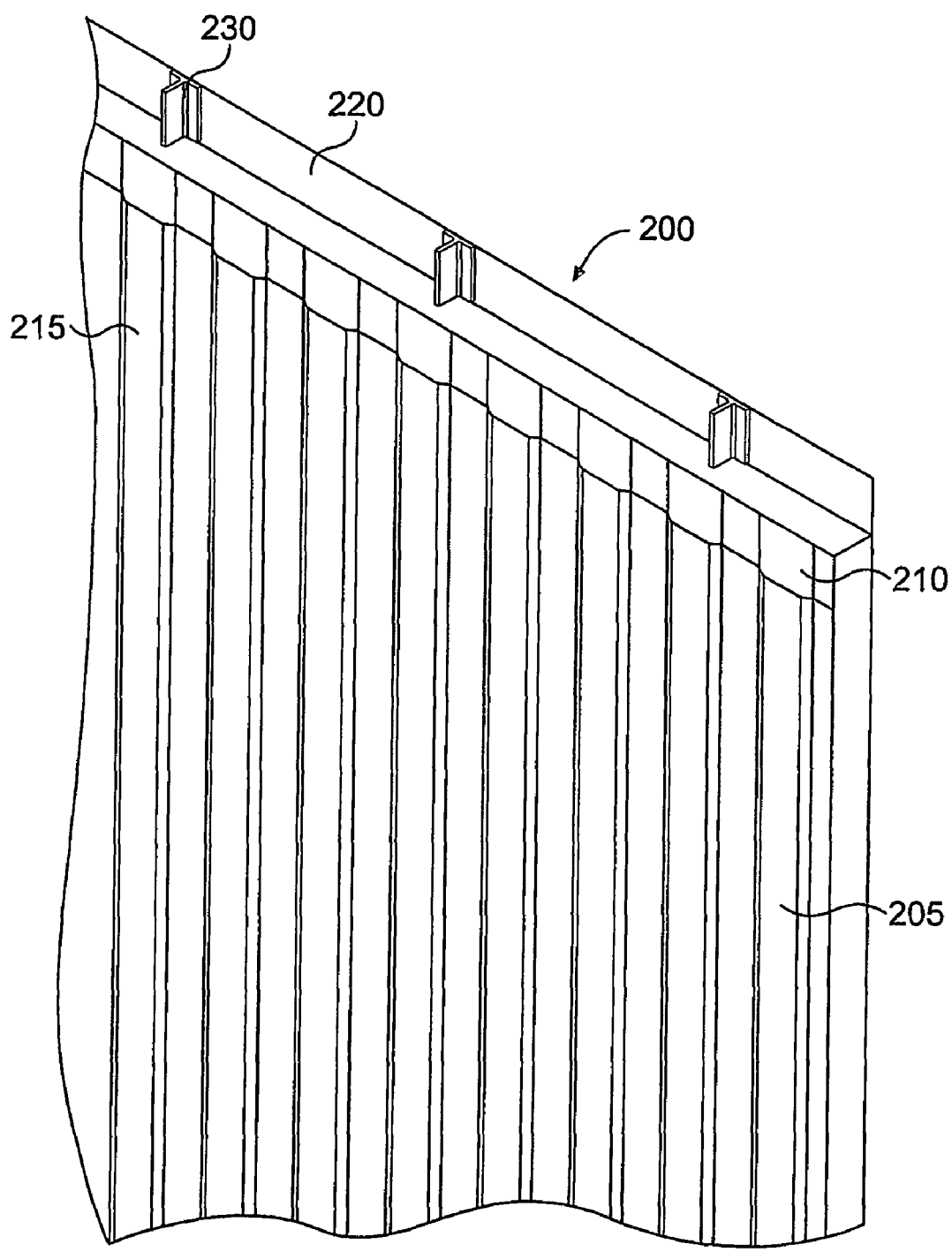
FIG. 2B is an enlarged isometric view of a portion of an insulated wall panel consistent with one embodiment of the invention.
Figure 2C:
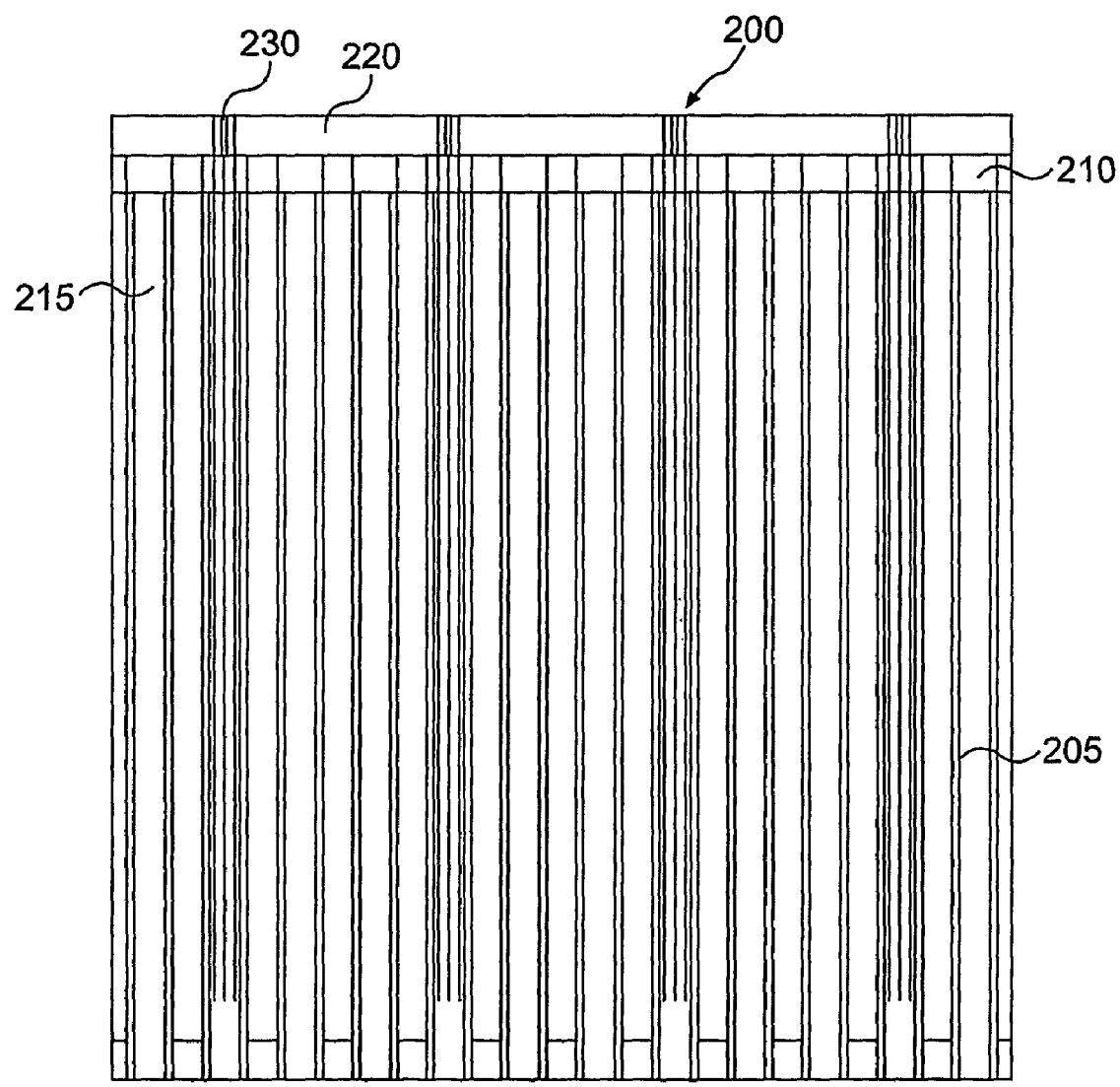
FIG. 2C is a front view of an insulated wall panel consistent with one embodiment of the invention.
Figure 2D:
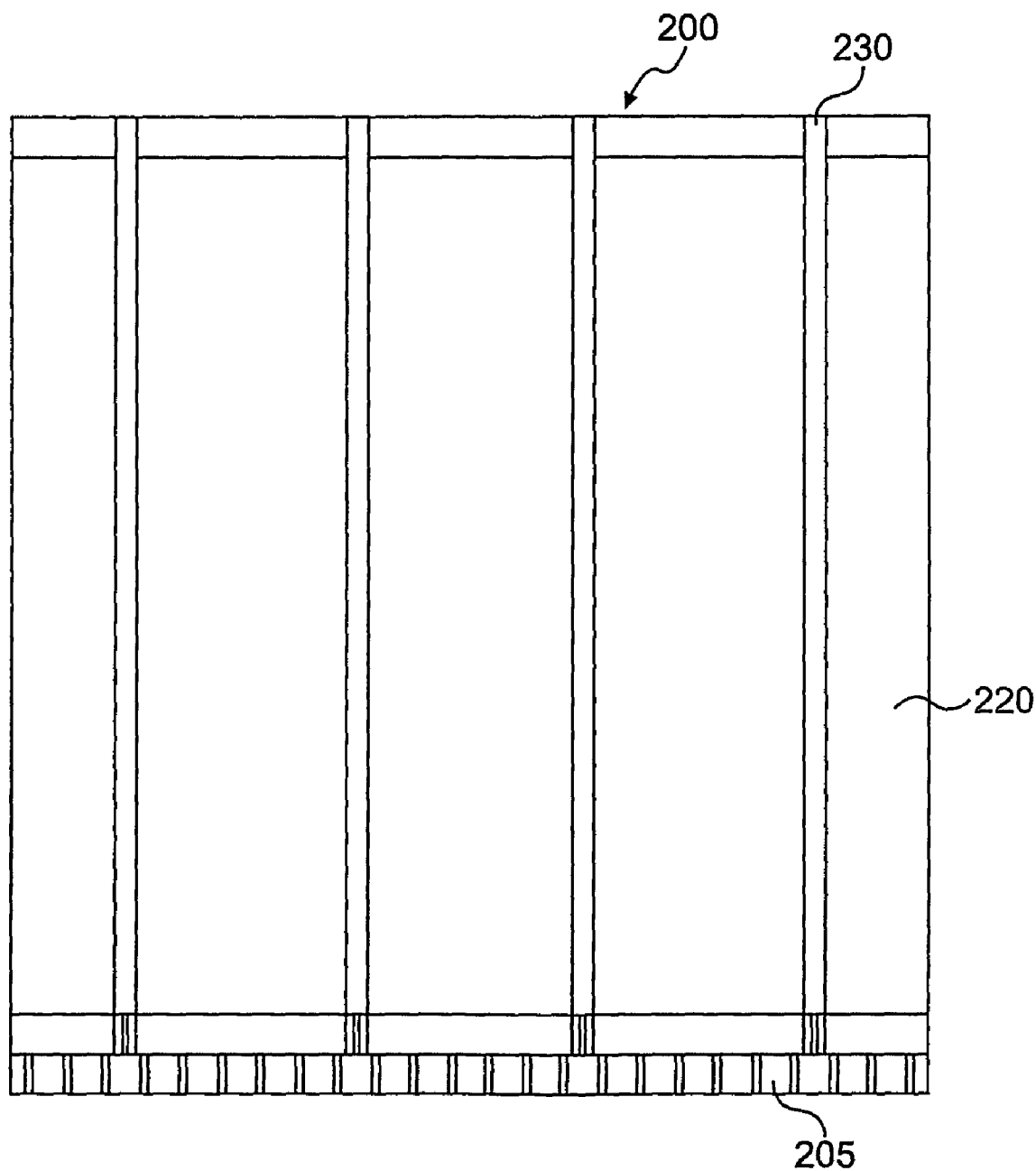
FIG. 2D is a rear view of an insulated wall panel consistent with one embodiment of the invention.
Figure 2E:
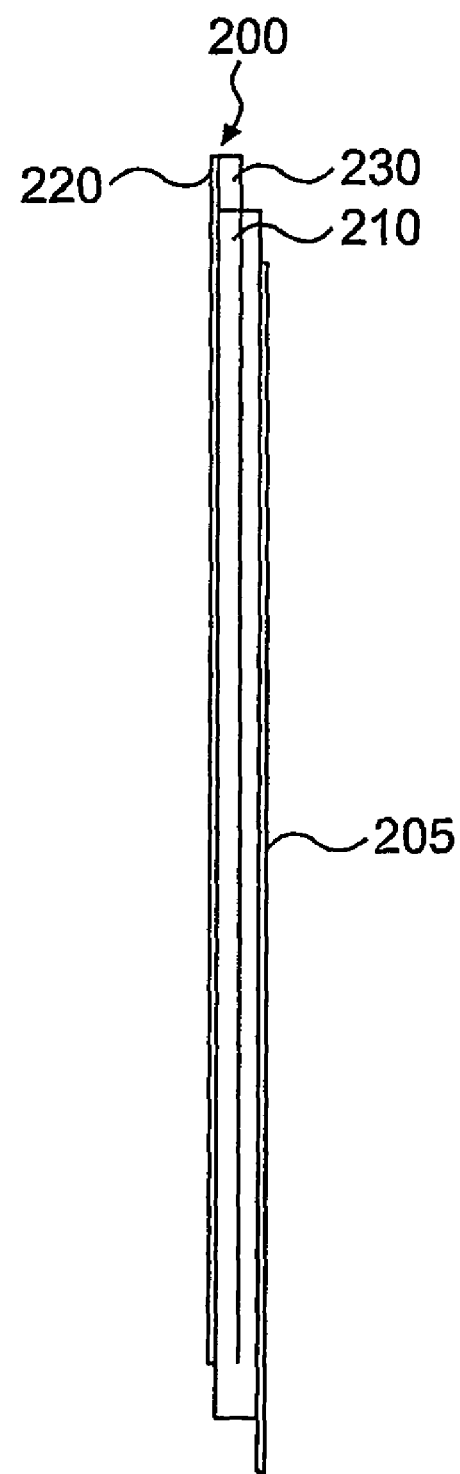
FIG. 2E is a side view of an insulated wall panel consistent with one embodiment of the invention.
Figure 2F:
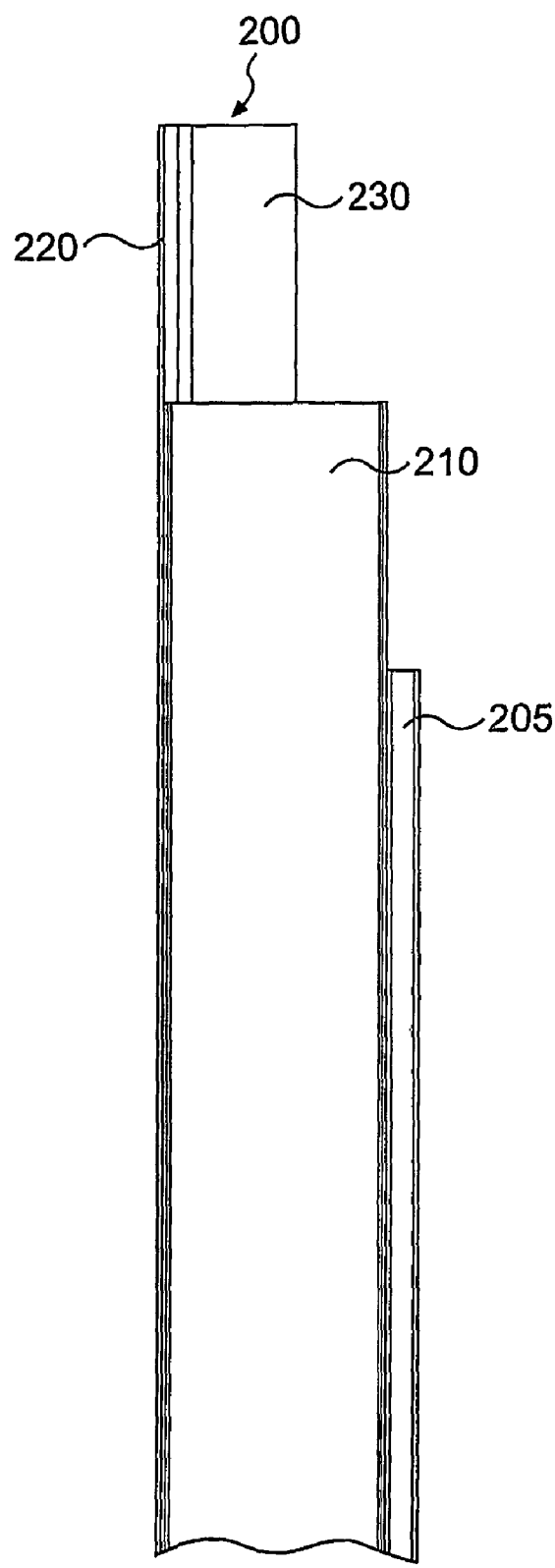
FIG. 2F is an enlarged side view of a portion of an insulated wall panel consistent with one embodiment of the invention.
Figure 2G:
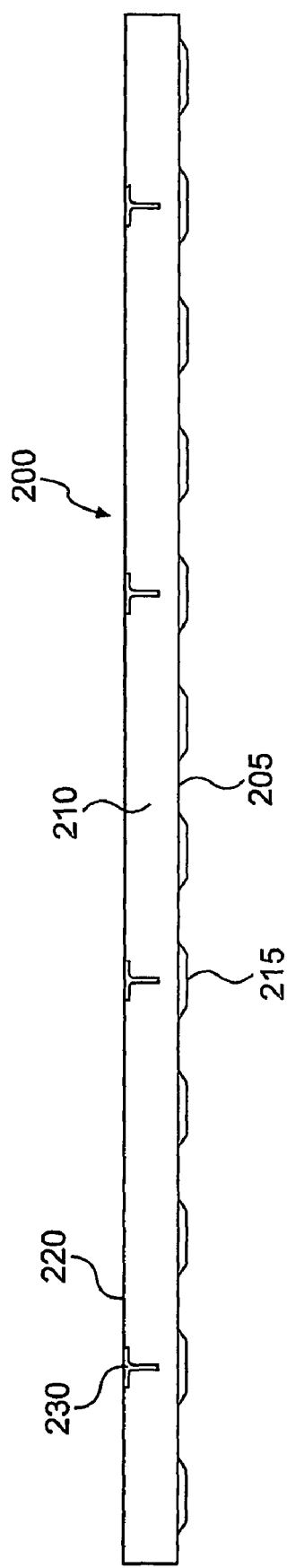
FIG. 2G is a top view of an insulated wall panel consistent with one embodiment of the invention.

Apparatus consistent with the present invention will now be described with respect to an embodiment of an insulated cargo container, a boxcar. The attached figures illustrate several embodiments of components of a boxcar consistent with the present invention. The invention as claimed, however, is broader than boxcars and extends to other large insulated cargo containers, such as, shipping containers used on seagoing container vessels, truck trailers, straight trucks, refrigerated buildings, or the like. Such containers may be merely insulated or both insulated and refrigerated.

B. Apparatus

FIG. 1 is an isometric view of an insulated boxcar consistent with one embodiment of the invention. As shown in FIG. 1, in one implementation, an insulated or refrigerated boxcar 100 includes wall panels 110, a roof 120, a floor 130, end walls 140, and a door 150. Wall panels 110, roof 120, floor 130, and end walls 140 combine to form an enclosure 160. Various types of cargo may be stored in enclosure 160 for transport in boxcar 100. Door 150 provides access to enclosure 160.

As described above, the thermal efficiency of boxcar 100 depends, in part, on the construction of wall panels 110, roof 120, floor 130, end walls 140, and door 150. The wall panels 110, roof 120, floor 130, end walls 140, and door 150 of the present invention provide for a higher R-value than prior systems. In one implementation, boxcar 100 has an overall R-value of 40-42 per inch of insulation. This implementation is merely exemplary, and other implementations may also be used.

Implementations of wall panels 110, roof 120, floor 130, end walls 140, and door 150 consistent with embodiments of the invention are described in detail below. It should be understood that any combination of the wall panels 110, roof 120, floor 130, end walls 140, and door 150 described below might be used to construct a cargo container consistent with the present invention.

FIGS. 2A-2G depict several views of an insulated wall panel consistent with one embodiment of the invention. As shown in FIGS. 2A-2G, in one implementation, an insulated wall panel 200 includes an interior panel 205, an insulation layer 210, an exterior panel 220, and structural members 230. The insulation layer is located between the interior panel 205 and the exterior panel 220 and surrounds the structural members 230. Insulated wall panel 200 may be used to form the wall panels of a boxcar, such as wall panels 110 of FIG. 1. This implementation is merely exemplary, and other implementations may also be used.

Exterior panel 220 forms the exterior surface of a cargo container in which insulated wall panel 200 are installed. Exterior panel may be constructed from any material suitable to form an exterior wall of a cargo container, such as metals, plastics, polymers, or any combination thereof. In one implementation, exterior panel 220 is constructed of galvanized steel. In another implementation, exterior panel 220 may be constructed of aluminum, steel, stainless steel, or fiber-reinforced plastics. The term "fiber-reinforced plastic" as used in this application refers to both thermosetting and thermoplastic fiber reinforced plastics. These implementations are merely exemplary, and other implementations may also be used.

Structural members 230 provide structural support and stiffening for insulated wall panel 200. Structural members 230 may be constructed in any shape and from any material suitable to provide structural support for insulated wall panel 200, such as metals, plastics, polymers, or any combination thereof. In one implementation, structural members 230 are manufactured from steel and have a T-shaped, L-shaped, I-shaped, or Z-shaped cross-section. As shown in FIGS. 2A-2G, structural members 230 are attached at various points on and extend vertically along the interior surface of exterior panel 220. Structural members 230 may be fastened to the exterior panel 220 by adhesives, mechanical fasteners, or welding. FIGS. 2A-2G depict four structural members 230 on exterior panel 220, however, any number of structural members 230 may be used. These implementations are merely exemplary, and other implementations may also be used.

Insulation layer 210 increases the thermal efficiency of insulated wall panel 200. Insulation layer 210 may be constructed from any insulating material that will increase the thermal efficiency of insulated wall panel 200. In one implementation, insulation layer 210 comprises a closed-cell polymer foam, such as urethane. In another implementation, insulation layer 210 comprises a vacuum insulated panel (described in more detail below). In yet another implementation, insulation layer 210 comprises a combination of foam and vacuum insulated panels. These implementations are merely exemplary, and other implementations may also be used.

Vacuum insulated panels are constructed of an outer skin of an impermeable film or laminate and an interior porous insulating material. The interior porous insulating material is evacuated to increase its insulating value and the outer skin provides a barrier to passage of air into the interior porous insulating material. The R-Value of the vacuum insulated panel depends, in part, on the thickness of the porous insulating material used. In one implementation, the film or laminate is a Mylar film. In another implementation, the porous insulating material is a micro-cellular, open-cell foam core material. In one implementation, the diameter of the cells is is on the order of $10^{-6}$ in. A one inch thick sheet of such a material may have a R-value (evacuated) of approximately 28. A micro-cellular, open-cell polystyrene foam, such as Instill™ available from Dow Chemicals may be used in such an implementation. In yet another implementation, the porous insulating material a fine fiberglass web core material. In one implementation, each fine fiberglass strand will have a diameter of approximately 0.001 in. A one inch thick sheet of such a material may have a R-value (evacuated) of approximately 40. A fine fiberglass web core material such as Threshold™ available from Thermal Visions may be used in such an implementation. These panels may be constructed from any of several well-known methods. These implementations are merely exemplary, and other implementations may also be used.

As shown in FIGS. 2A-2G, insulation layer 210 is attached to exterior panel 220 and around structural members 230. Insulation layer 210 may be attached to exterior panel 220 by fasteners or an adhesive. In one implementation, a spray adhesive or a caulk adhesive, such as TremPro 650 available from Tremco is used. These implementations are merely exemplary, and other implementations may also be used.

Figure 2H:
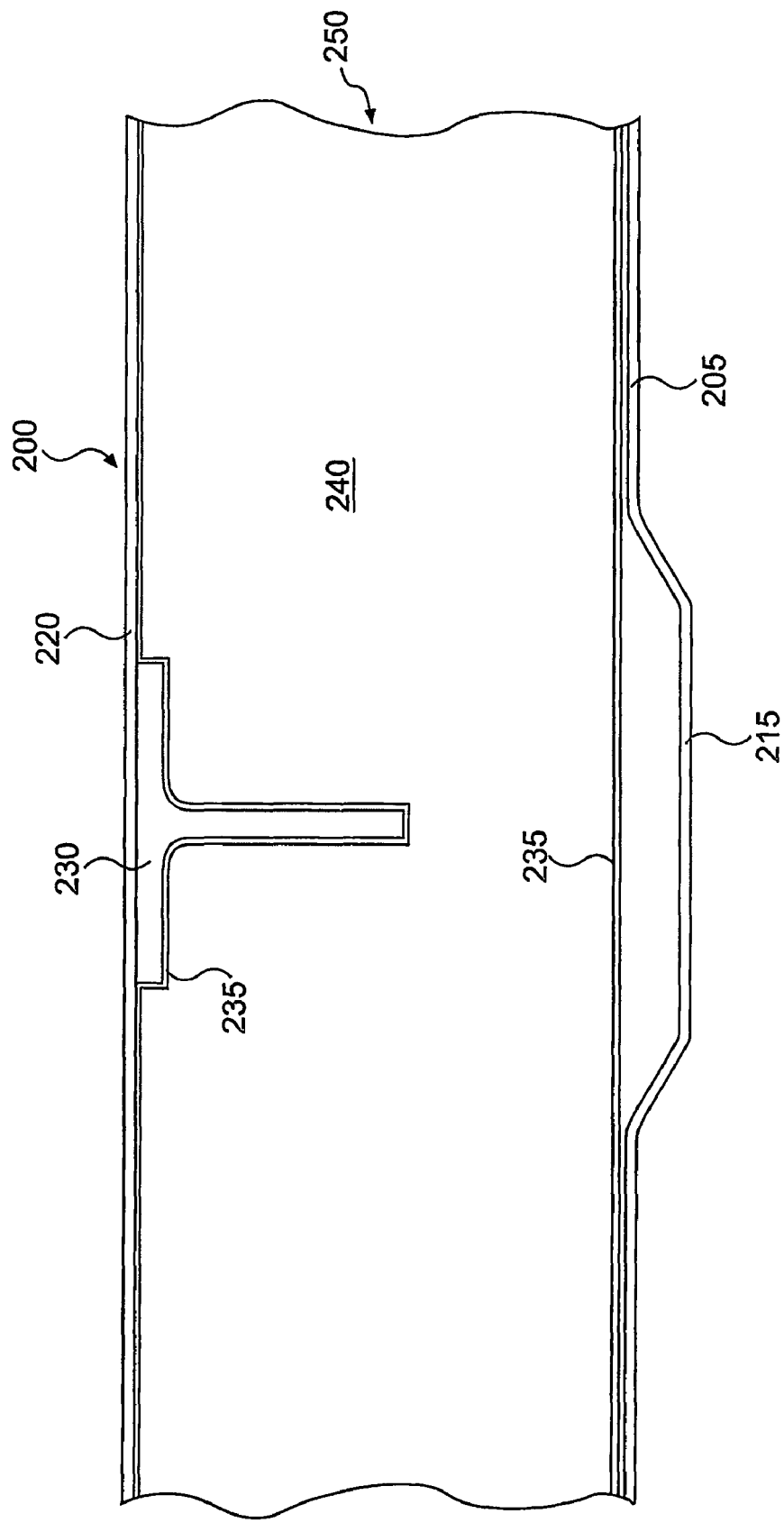
FIG. 2H is an enlarged top view of a portion of an insulated wall panel consistent with one embodiment of the invention.

Interior panel 205 forms the interior surface of insulated wall panel 200. Interior panel 205 may be constructed from any material, such as metals, plastics, polymers, or any combination thereof, and in any shape suitable to form the interior wall of a cargo container. In one implementation, interior panel 205 is constructed from fiber-reinforced plastics. As shown in FIGS. 2A-2G, interior panel 205 may also include integral corrugations 215. Integral corrugations 215 allow for airflow on insulated wall panel 200 to improve the thermal efficiency of insulated wall panel 200. In one implementation, as best seen in FIG. 2H, internal corrugations 215 include a series of trapezoidal shaped protrusions. In another implementation, interior panel 205 is flat and does not include corrugations. These implementations are merely exemplary, and other implementations may also be used.

As shown in FIGS. 2A-2G, interior panel 205 is placed over insulation layer 210. Interior panel 205 may be attached to insulation layer 210 by fasteners, adhesives, or structural tapes. In one implementation, a spray adhesive or a caulk adhesive, such as TremPro 650 is used. In FIGS. 2A-2G, interior panel 205 is displaced to reveal insulation layer 210. In practice, however, interior panel 205 would, along with exterior panel 220, completely cover insulation layer 210. In one implementation, interior panel 205 is a fiber-reinforced plastic panel. This implementation is merely exemplary, and other implementations may also be used.

FIG. 2H is an enlarged top view of a portion of an insulated wall panel comprising a vacuum insulated panel consistent with one embodiment of the invention, as shown in FIGS. 2A-2G. As shown in FIG. 2H, exterior panel 220 forms the exterior wall of insulated wall panel 200. Structural member 230 is then attached to the interior surface of exterior panel 220. As further shown in FIG. 2H, a vacuum insulated panel 250 is attached to exterior wall panel 200 and around structural member 230. Vacuum insulated panel 250 (as described above) includes an outer skin of an impermeable film or laminate 235 and an interior porous insulating material 240. Finally, interior panel 205 including internal corrugations 215 is attached to vacuum insulated panel 250. This implementation is merely exemplary, and other implementations may also be used.

Figure 3A:
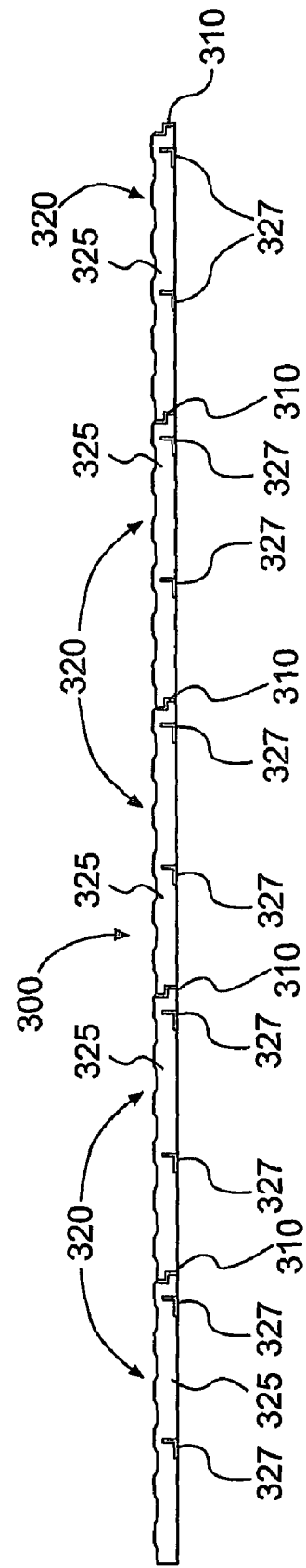
FIG. 3A is a top view of a section of a sidewall of an insulated boxcar including insulated wall panels consistent with one embodiment of the invention.

FIG. 3A is a top view of a section of a sidewall of an insulated boxcar including insulated wall panels consistent with one embodiment of the invention. As shown in FIG. 3A, a series of wall panels 320 constructed as generally described in FIGS. 2A-2H with a foam insulation material 325 and structural members 327 are interconnected to form a sidewall section 300 of a cargo container. In one implementation, wall panels 320 include joints 310 for interconnecting wall panels 320. Joints 310 may be any attachment mechanism for interconnecting wall panels 320. In one implementation, joints 310 may be lap joints as shown in FIG. 3A or other interlocking joints may lock the panels one to the other at their edges such as a tongue and groove joint. Wall panels 320 may also be connected using an adhesive or fastener. In one implementation, a structural adhesive, such as such as Pliogrip 7700 available from Ashland Specialty Chemical Company is used. These implementations are merely exemplary, and other implementations may also be used.

Figure 3B:
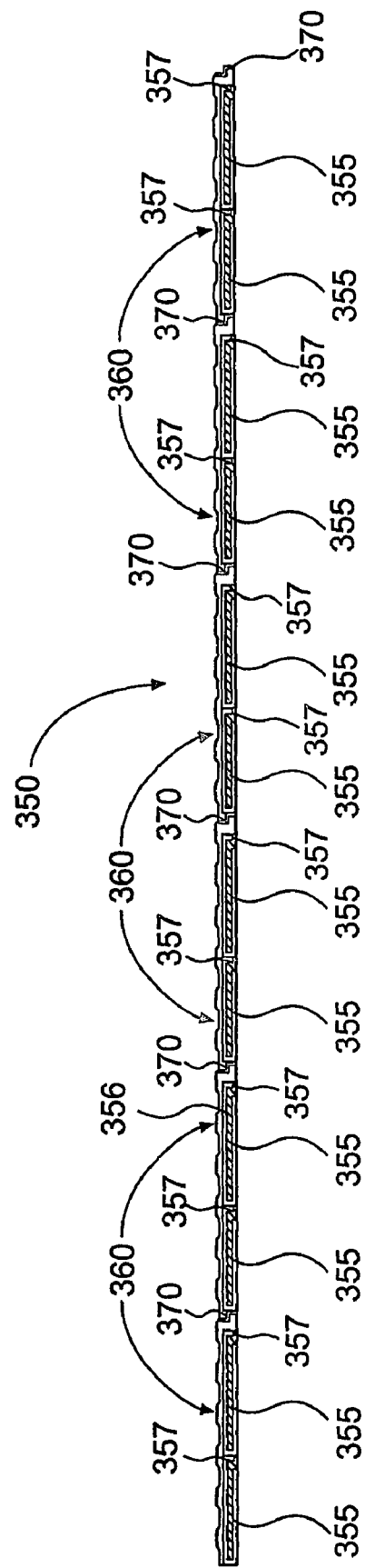
FIG. 3B is a top view of a section of a sidewall of an insulated boxcar including insulated wall panels consistent with another embodiment of the invention.

FIG. 3B is a top view of a section of a sidewall of an insulated boxcar including insulated wall panels consistent with another embodiment of the invention. As shown in FIG. 3B, a series of wall panels 360 constructed generally as described in FIGS. 2A-2H with insulated vacuum panels 355 and structural members 357 are interconnected to form an insulated sidewall 350 of a cargo container. In one implementation, wall panels 360 include joints 370 for interconnecting wall panels 360 as described above. These implementations are merely exemplary, and other implementations may also be used.

Figure 3C:
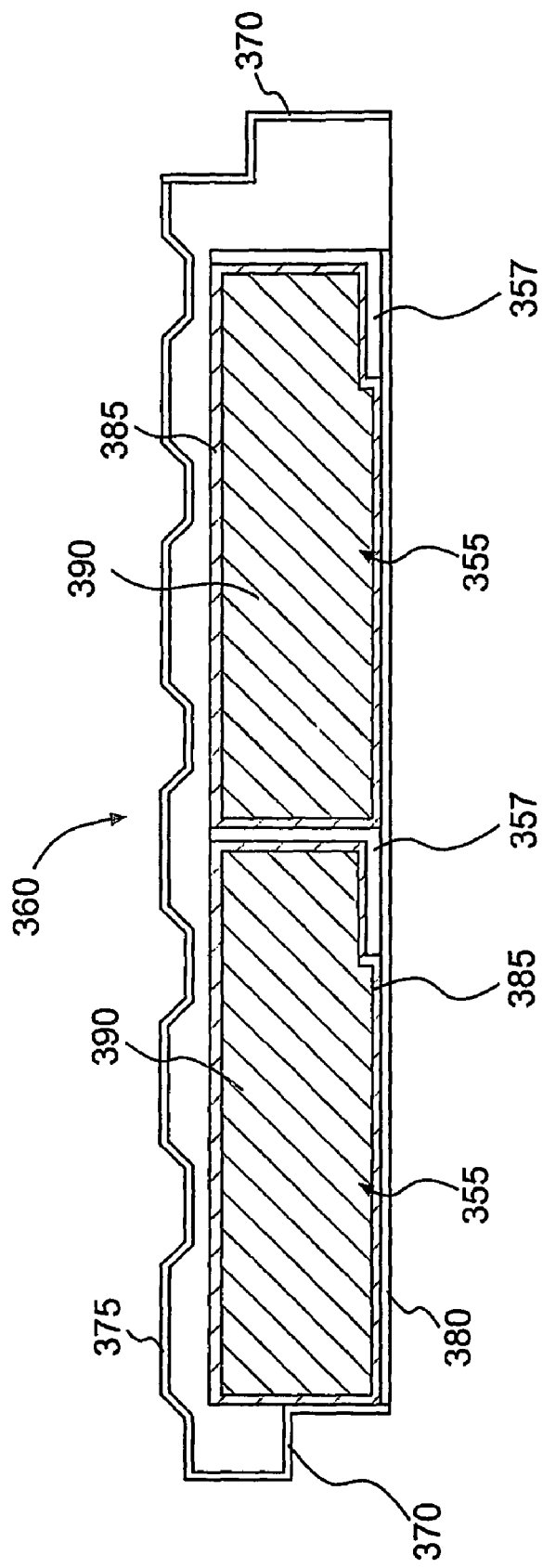
FIG. 3C is a top view of an insulated wall panel of FIG. 3B.

FIG. 3C is a top view of an insulated wall panel of FIG. 3B. As shown in FIG. 3C, wall panel 360 is constructed generally as described in FIGS. 2A-2H. Wall panel 360 comprises an exterior panel 380, vacuum insulated panels 355, an interior panel 375, and structural members 357. Vacuum insulated panel 355 includes an outer skin of an impermeable film or laminate 385 and an interior porous insulating material 390. Insulated wall panel 360 also includes joints 370. This implementation is merely exemplary, and other implementations may also be used.

Figure 4B:
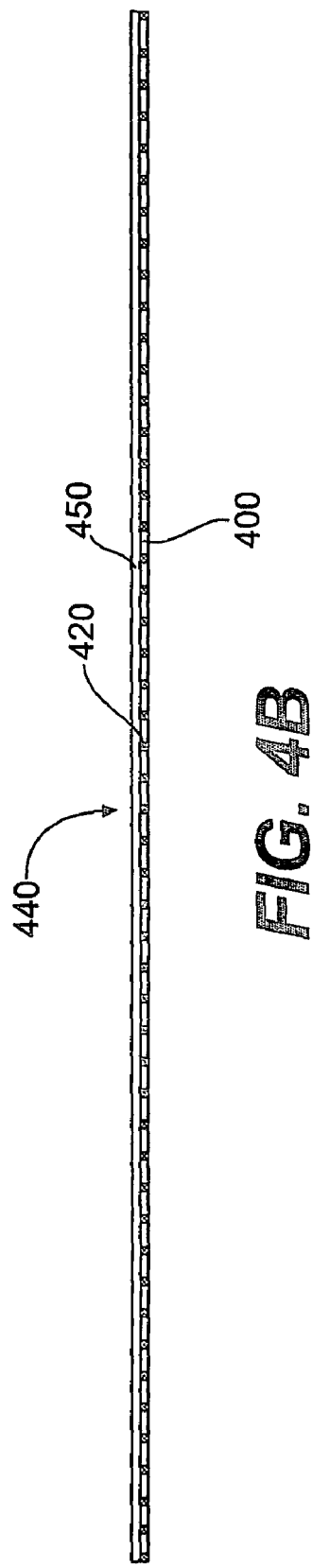
FIG. 4B is a side view of an insulated floor system consistent with one embodiment of the invention.
Figure 4C:
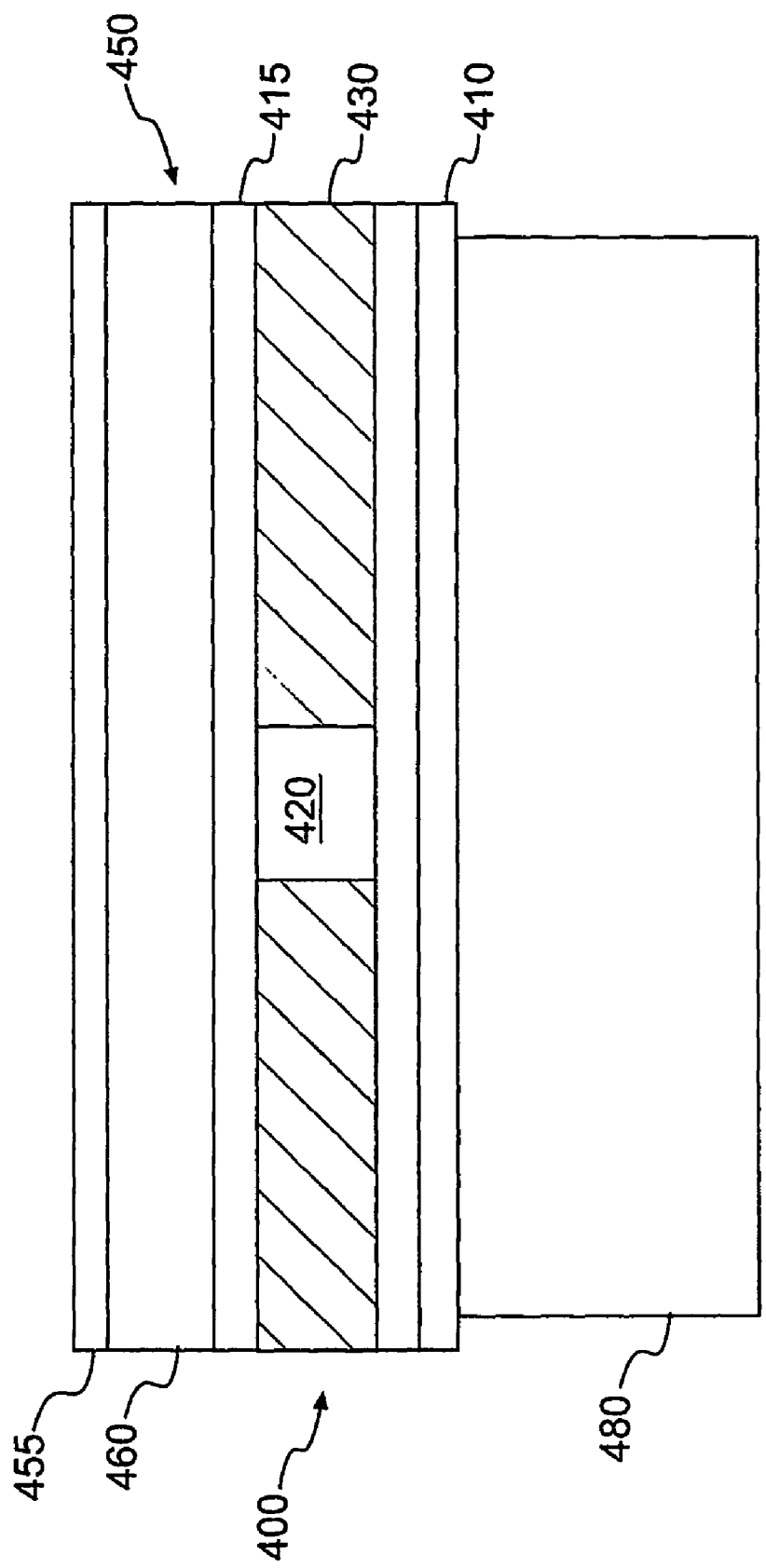
FIG. 4C is a cross-section view of a portion of an insulated floor system consistent with one embodiment of the invention.

FIGS. 4A-4C illustrate several views of an insulated floor system consistent with one embodiment of the invention. As shown in FIGS. 4A-4C, an insulated floor system 440 comprises a primary floor 400, a secondary floor 450, and a center sill 480. Insulated floor system 440 may be used to form the floor of an insulated, such as floor 130 of FIG. 1. This implementation is merely exemplary, and other implementations may also be used.

Primary floor 400 forms the bottom surface of the cargo container and insulates the floor of the railcar. As shown in FIGS. 4A-4B, secondary floor 450 is located on top of primary floor 400. Secondary floor 450 forms the interior floor surface of the cargo container and provides structural support for insulated floor system 440. Primary floor 400 and secondary floor 450 are described in more detail below.

Center sill 480 is the main longitudinal structural member of a boxcar underframe. As shown in FIG. 4A, center sill 480 is substantially centered on and extends longitudinally under the undersurface of primary floor 400. Center sill 480 may be constructed of any material, such as metals, plastics, polymers, or any combination thereof, and in any shape so as to provide support for the boxcar underframe. In one implementation, center sill 480 is constructed of steel and is welded to primary floor 400. These implementations are merely exemplary, and other implementations may also be used.

In one implementation, primary floor 400 includes a bottom skin 410, a top skin 415, an insulation layer 430, structural tubes 420, and side channels 435. As shown in FIGS. 4A-4C, bottom skin 410 forms the bottom surface of primary floor 400. Bottom skin 410 may be constructed of any material suitable to form a bottom layer of primary floor 400, such as metals, plastics, polymers, or any combination thereof, and may be attached to primary floor using fasteners, adhesives, or welding. In one implementation, bottom skin 410 is constructed of carbon steel. Bottom skin 410 may also be constructed of aluminum, stainless steel, or fiber-reinforced plastics. These implementations are merely exemplary, and other implementations may also be used.

Side channels 435 form the sidewalls of primary floor 400. As shown in FIGS. 4A-4C, side channels 435 are located on opposing sides of bottom skin 400. Side channels 435 may be attached to primary floor using fasteners, adhesives, or welding. In one implementation, side channels 435 are attached to bottom skin 410 with a structural adhesive, such as Pliogrip 7700. These implementations are merely exemplary, and other implementations may also be used.

Side channels 435 may be constructed of any material, such as metals, plastics, polymers, or any combination thereof, and in any shape suitable to form the sidewalls of primary floor 400. In one implementation, side channels 435 have a C-shaped cross section and are constructed of fiber-reinforced plastics. In another implementation, an insulation foam block is located inside the legs of side channels 435. The insulation foam block may be constructed of any insulation foam, such as urethane foam and attached to side channels 435 with a spray adhesive. These implementations are merely exemplary, and other implementations may also be used.

Structural tubes 420 provide structural support for primary floor 400. As shown in FIGS. 4A-4C, structural tubes 420 are located on bottom skin 410 and extend between side channels 435. Structural tubes 420 may be attached to primary floor using fasteners, adhesives, or welding. In one implementation, structural tubes 420 are attached to bottom skin 410 with a structural adhesive, such as Pliogrip 7700. While FIG. 4B depicts 50 structural tubes 420, any number of structural tubes 420 may be used. In addition, structural tubes 420 may be constructed of any material, such as metals, plastics, polymers, or any combination thereof, and in any shape suitable to form the sidewalls of primary floor 400. In one implementation, structural tubes 420 have a rectangular cross section and are constructed of fiber-reinforced plastics. These implementations are merely exemplary, and other implementations may also be used.

Insulation layer 430 increases the thermal efficiency of insulated floor system 440. As shown in FIGS. 4A-4C, insulation layer 430 is located on bottom skin 410 in the area between structural tubes 420. Insulation layer 430 may be attached to bottom skin 410 using spray adhesives or caulk adhesives, such as TremPro 650. Insulation layer 430 may be constructed from any insulating material that will increase the thermal efficiency of insulated floor system 440. In one implementation, insulation layer 430 comprises a closed-cell polymer foam, such as urethane. In another implementation, insulation layer 430 comprises a vacuum insulated panel (described above). In yet another implementation, insulation layer 430 comprises a combination of foam and vacuum insulated panels. These implementations are merely exemplary, and other implementations may also be used.

As shown in FIGS. 4A-4C, top skin 415 forms the top surface of primary floor 400. Top skin 415 is located on insulation layer 430 and structural tubes 420. Top skin 415 may be constructed of any material suitable to form a top layer of primary floor 400, such as metals, plastics, polymers, or any combination thereof, and may be attached to primary floor using fasteners, adhesives, welding, or structural tape. In one implementation, top skin 415 is constructed of carbon steel and attached to insulation layer 430 with a spray adhesive or a caulk adhesive, such as TremPro 650 and to structural tubes 420 with a structural adhesive, such as Pliogrip 7700. Top skin 415 may also be constructed of aluminum, stainless steel, or fiber-reinforced plastics. These implementations are merely exemplary, and other implementations may also be used.

As described above, secondary floor 450 is located on primary floor 400. In one implementation, secondary floor 450 includes support layer 460 and tread plate sheet 455. Support layer 460 provides structural support for floor 400. Support layer 460 is located on and extends across the length of the top surface of top skin 415. Support layer 460 may be constructed of a any material suitable to support tread plate sheet 455 and any other objects placed on tread plate sheet 455. In one implementation, support layer 460 comprises a plurality of I-beams constructed of aluminum and attached to top skin 415 with adhesive structural tape. These implementations are merely exemplary, and other implementations may also be used.

As depicted in FIG. 4A, tread plate sheet 455 provides the interior surface of floor 400. Tread plate sheet 455 is located on support layer 460. Tread plate sheet 455 may be constructed of any material suitable to form an interior floor surface of insulated floor system 440, such as metals, plastics, polymers, or any combination thereof, and may be attached to primary floor using fasteners, adhesives, welding, or structural tape. In one implementation, tread plate sheet 455 is constructed of aluminum and attached to support layer 460 with adhesive structural tape. These implementations are merely exemplary, and other implementations may also be used.

Figure 5A:
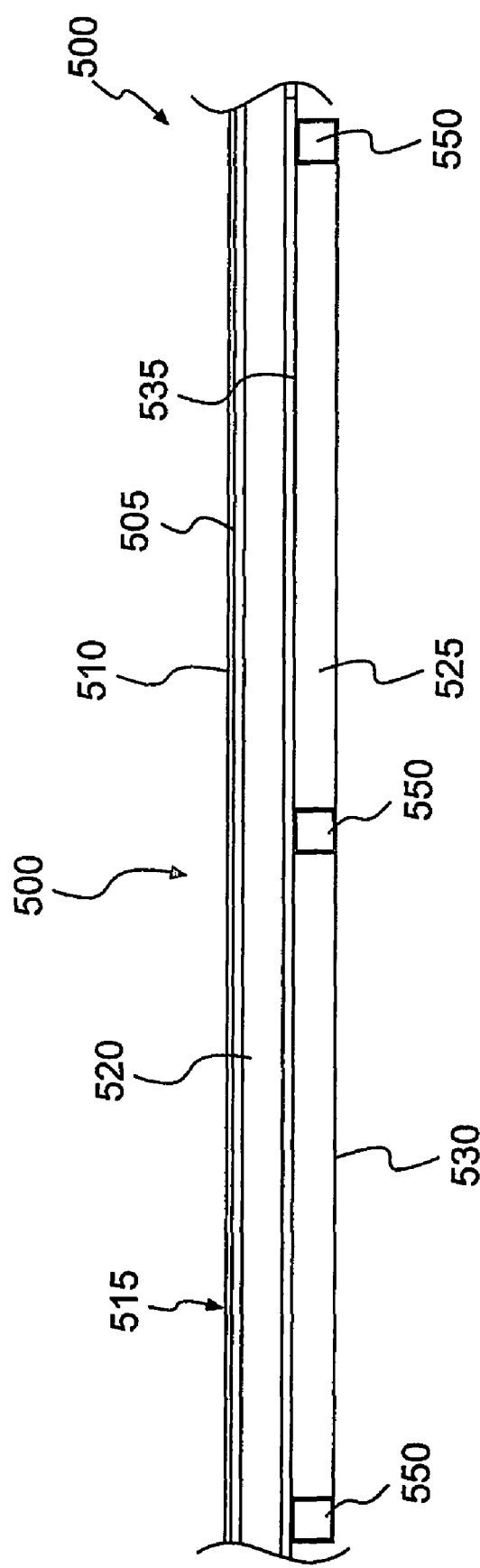
FIG. 5A is a front view of an insulated roof system consistent with one embodiment of the invention.
Figure 5B:
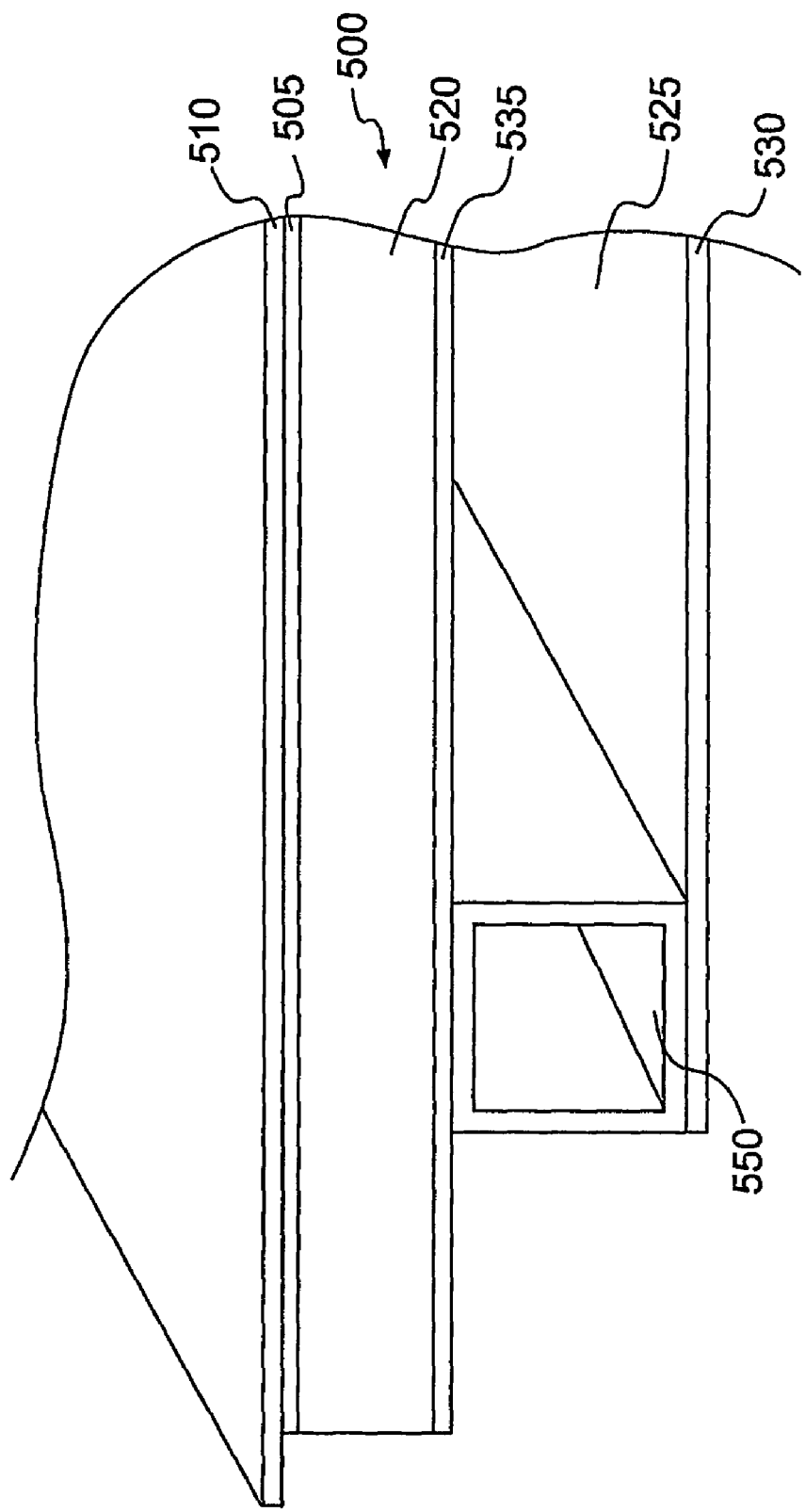
FIG. 5B is a front isometric view of a portion of an insulated roof system consistent with one embodiment of the invention.

FIGS. 5A-5B illustrate two views of an insulated roof system consistent with one embodiment of the invention. As shown in FIGS. 5A and 5B, an insulated roof system 500 includes a roof 515 and a plenum 525. Roof 515 may be used to form the roof of a boxcar, such as roof 120 of FIG. 1. In one implementation, roof 515 includes a roof plate 510, an exterior skin 505, an insulation layer 520, and an interior skin 535. Roof plate 510 forms the exterior surface of roof 515. Roof plate 510 may be constructed of any material suitable to form an exterior surface of a cargo container, such as metals, plastics, polymers, or any combination thereof. In one implementation, roof plate 510 is constructed of carbon steel, stainless steel or aluminum. This implementation is merely exemplary and other implementations may also be used.

As shown in FIGS. 5A-5B, exterior skin 505 is located on the bottom surface of roof plate 510. Exterior skin 505 may be constructed of metals, plastics, polymers, or any combination thereof and may be attached to roof plate 510 using fasteners or adhesives. In one implementation, exterior skin 505 is constructed of fiber-reinforced plastics and attached to roof plate 510 with a structural adhesive, such as Pliogrip 7700. This implementation is merely exemplary and other implementations may also be used.

Insulation layer 520 increases the thermal efficiency of roof 515. As shown in FIGS. 5A-5B, insulation layer 520 is located on the bottom surface of exterior skin 505. Insulation layer 520 may be attached to exterior skin 505 using adhesives or fasteners. In one implementation, a spray adhesive or a caulk adhesive, such as TremPro 650 is used. Insulation layer 520 may be constructed from any insulating material that will increase the thermal efficiency of insulated roof system 500. In one implementation, insulation layer 520 comprises a closed-cell polymer foam, such as urethane. In another implementation, insulation layer 520 comprises a vacuum insulated panel (described above). In yet another implementation, insulation layer 520 comprises a combination of foam and vacuum insulated panels. These implementations are merely exemplary, and other implementations may also be used.

As shown in FIGS. 5A-5B, interior skin 535 is located on the bottom surface of insulation layer 520. Interior skin 535 may be constructed of metals, plastics, polymers, or any combination thereof and may be attached to insulation layer 520 using fasteners or adhesives. In one implementation, interior skin 535 is constructed of fiber-reinforced plastics and attached to insulation layer 520 with a spray adhesive or a caulk adhesive, such as TremPro 650. This implementation is merely exemplary and other implementations may also be used.

Plenum 525 provides a channel for air-flow in roof system 500 to improve air temperature distribution in the boxcar. In one implementation, plenum 525 includes a bottom sheet 530 and square tubes 550. Square tubes 550 provide support for plenum 525. As shown in FIGS. 5A-5B, square tubes 550 are located on and extend longitudinally across interior skin 535. Square tubes 550 may be constructed of metals, plastics, polymers, or any combination thereof in any shape and may be attached to interior skin 535 using fasteners or adhesives. In one implementation, square tubes 550 are constructed of fiber-reinforced plastics and attached to interior skin 535 with a structural adhesive, such as Pliogrip 7700. While FIGS. 5A-5B illustrate the use of three square tubes 550, any number of tubes of any shape may be used. These implementations are merely exemplary, and other implementations may also be used.

Bottom sheet 530 forms the interior surface of plenum 525. As shown in FIGS. 5A-5B, bottom sheet 530 is located on the bottom surface of square tubes 550. Bottom sheet 530 may be constructed of metals, plastics, polymers, or any combination thereof and may be attached to square tubes 550 using fasteners or adhesives. In one implementation, bottom sheet 530 is formed of a fiber-reinforced plastic and attached to square tubes 550 with a structural adhesive, such as Pliogrip 7700. This implementation is merely exemplary and other implementations may also be used.

Figure 5C:
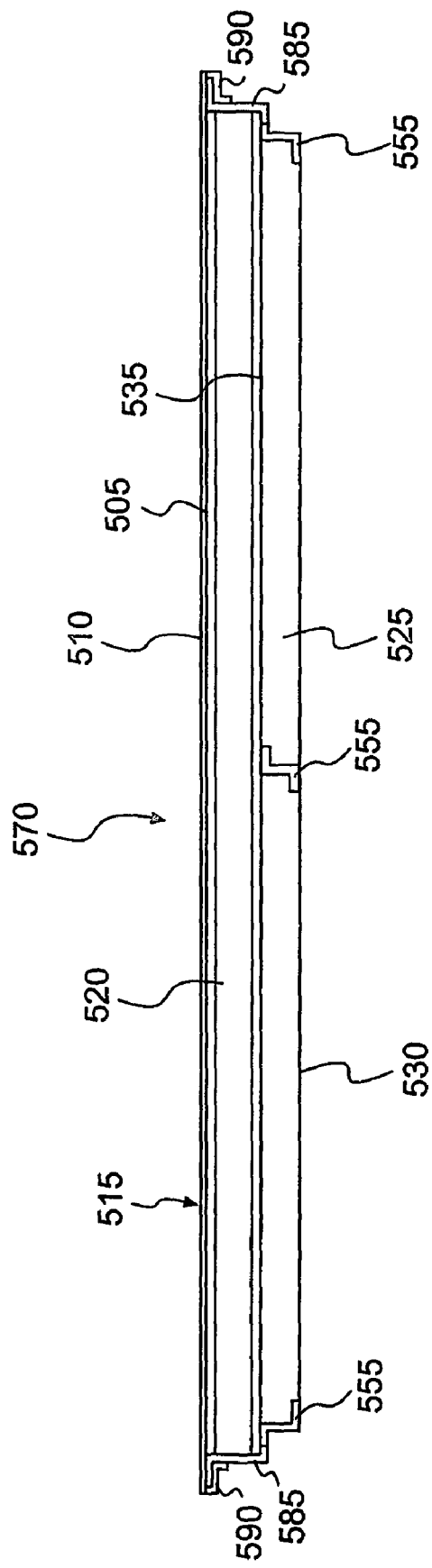
FIG. 5C is a front view of an insulated roof system consistent with another embodiment of the invention.
Figure 5D:
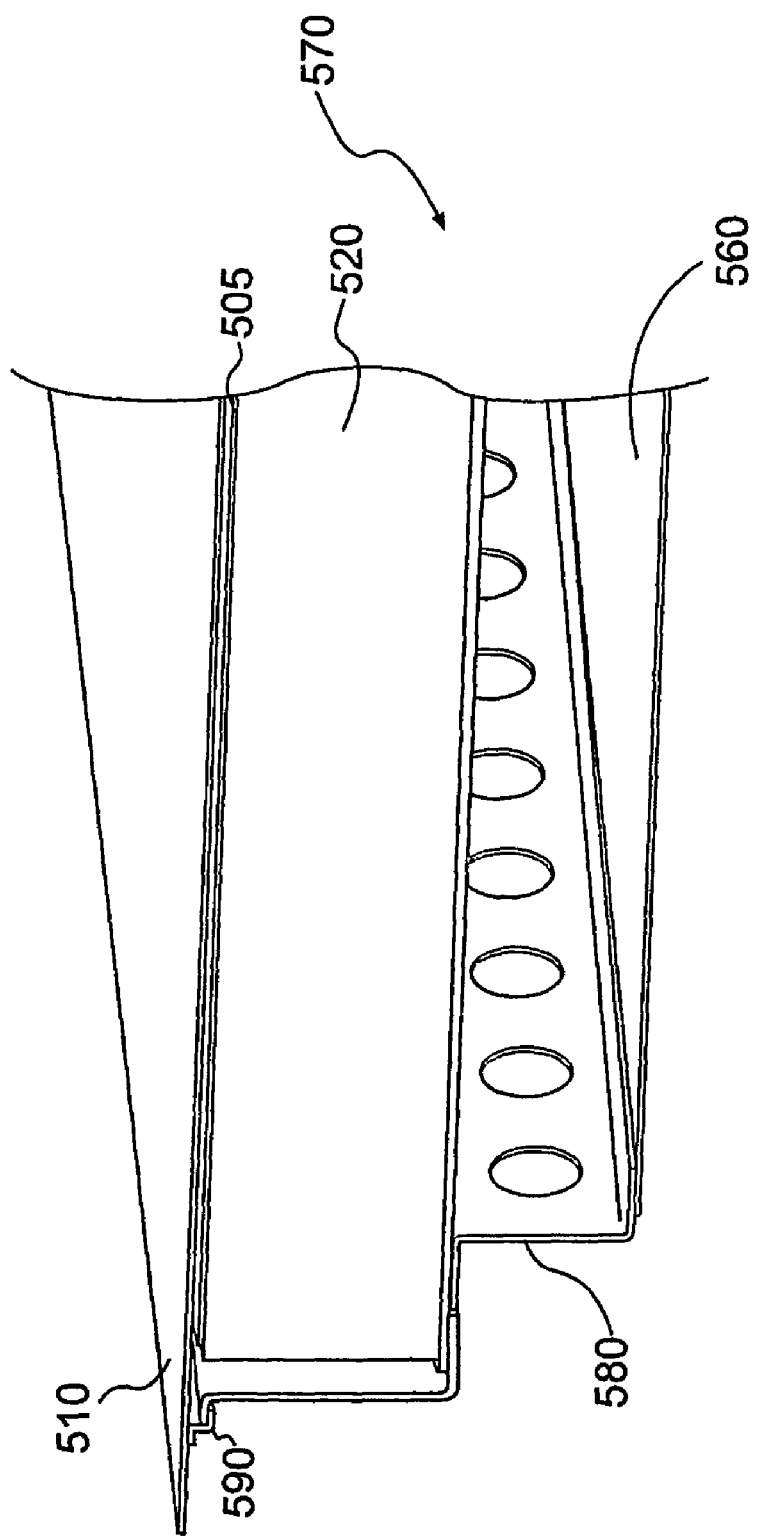
FIG. 5D is a front isometric view of a portion of an insulated roof system consistent with another embodiment of the invention.

FIGS. 5C-5D illustrate two views of an insulated roof system consistent with another embodiment of the invention. As shown in FIG. 5C, roof system 570 is similar to roof system 500 of FIGS. 5A and 5B, except roof system 570 lacks square tubes 550 and includes collapsible members 555, hangers 585, and support members 590. Support members 590 provide structural support for the hangers 585. As shown in FIGS. 5C-5D, support members 590 are attached to roof plate 510. Support members 590 may be attached to roof plate 510 using fasteners, adhesives, or welding. In one implementation, support members 590 are attached to roof plate 510 with a structural adhesive, such as Pliogrip 7700. In addition, support members 590 may be constructed of any material, such as metals, plastics, polymers, or any combination thereof, and in any shape suitable to support hangers 585. In one implementation, support members are constructed of steel or aluminum and have a Z-shaped cross-section. These implementations are merely exemplary and other implementations may also be used.

Hangers 585 support insulation layer 520 and interior skin 535. As shown in FIGS. 5C-5D hangers 585 are attached to support members 590 and interior skin 535. Hangers 585 may be attached to support members 590 and interior skin 535 using fasteners, adhesives, or welding. In one implementation, support members 590 are attached to roof plate 510 with a structural adhesive, such as Pliogrip 7700. In addition, hangers 585 may be constructed of any material, such as metals, plastics, polymers, or any combination thereof, and in any shape suitable to support insulation layer 520 and interior skin 535. In one implementation, support members are constructed of steel or aluminum and have a Z-shaped cross-section. These implementations are merely exemplary and other implementations may also be used.

Collapsible members 555 combine with bottom sheet 530 to form plenum 525. In addition, collapsible members 555 help prevent damage caused by impacts to bottom sheet 530 by temporarily collapsing when bottom sheet 530 is struck with a sufficient force. This will prevent this force from being completely transmitted to the rest of roof system 570. As shown in FIG. 5C, collapsible members 555 are attached to interior skin 535 and bottom sheet 530 is then attached to collapsible members 555. Collapsible members 555 may be attached to interior skin 535 and bottom sheet 530 using fasteners, adhesives, or welding. In one implementation, collapsible members 555 are attached to interior skin 535 and bottom sheet 530 with a structural adhesive, such as Pliogrip 7700. In addition, collapsible members 555 may be constructed of any material, such as metals, plastics, polymers, or any combination thereof, and in any shape that is capable of temporarily collapsing to prevent the transmission of excessive forces. In one implementation, collapsible members 555 are constructed pultruded composites and have a Z-shaped cross-section. These implementations are merely exemplary and other implementations may also be used.

FIGS. 6A-6I depict several views of an insulated door panel consistent with one embodiment of the invention. As shown in FIGS. 6A-6I, in one implementation, an insulated door 600 includes a interior panel 610, an insulation layer 670, and an outer door panel 630. Insulated door 600 may be used to form the door of an insulated boxcar, such as door 150 of FIG. 1. This implementation is merely exemplary and other implementations may also be used.

Figure 6A:
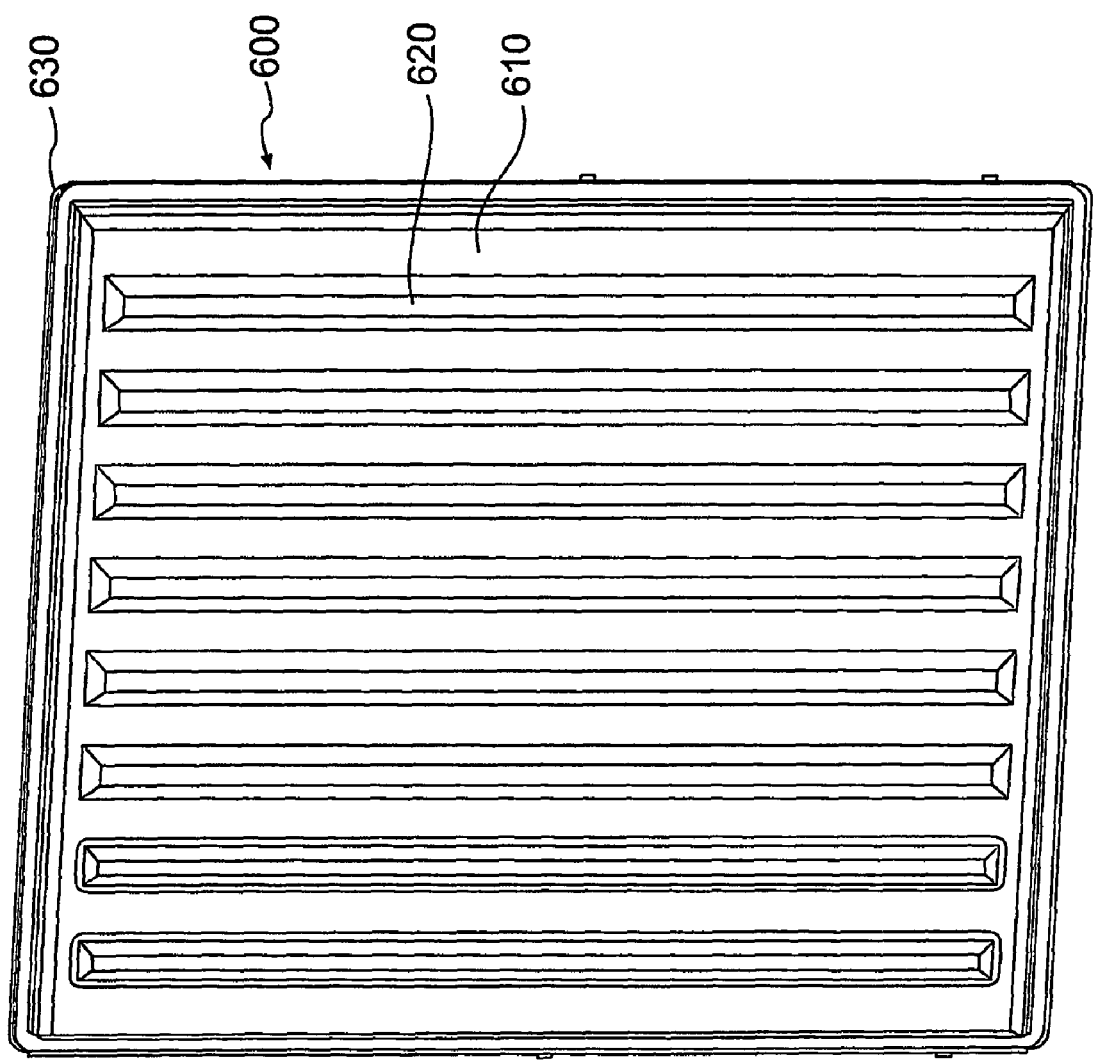
FIG. 6A is a rear view of an insulated door panel consistent with one embodiment of the invention.
Figure 6C:
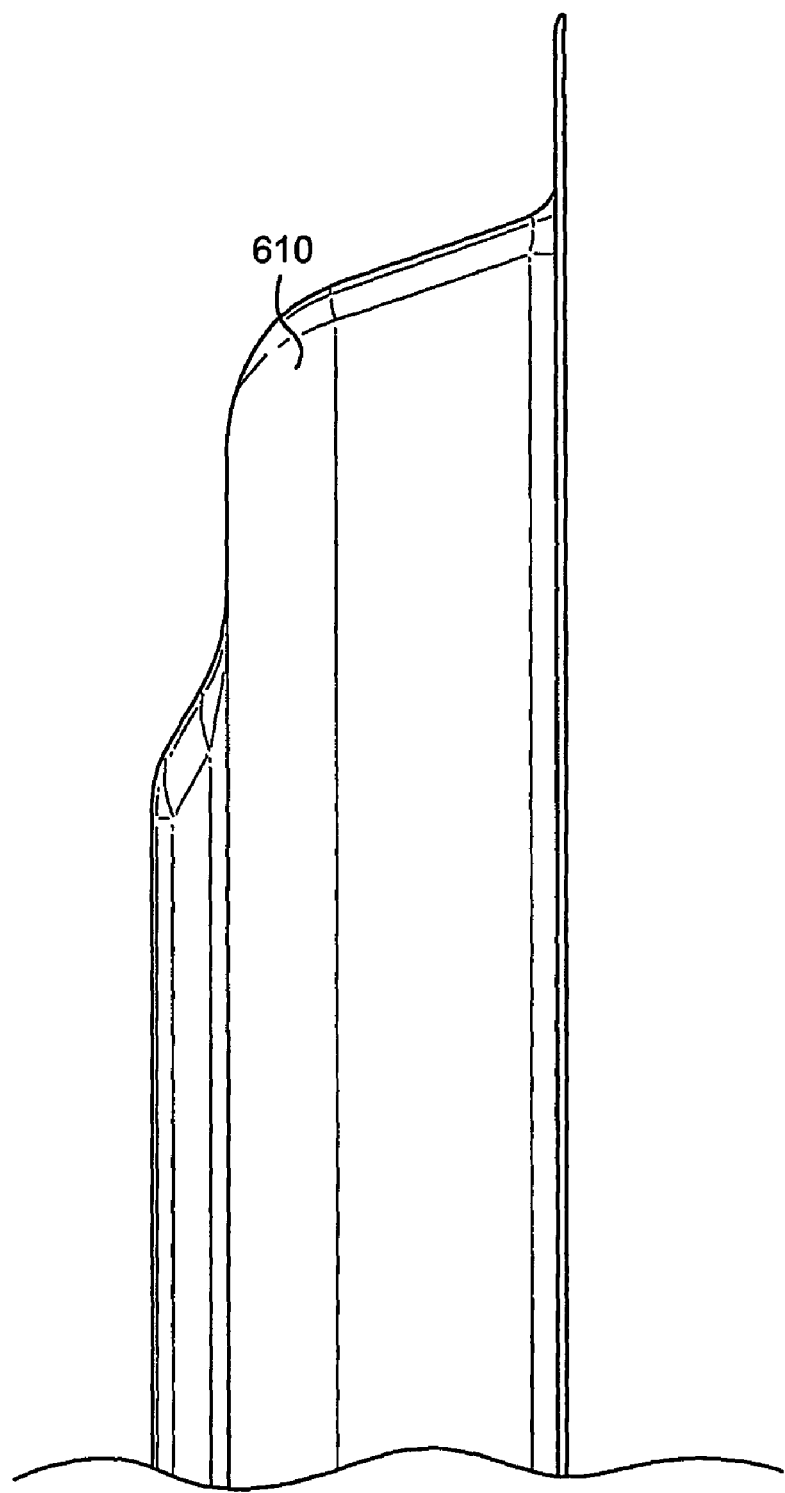
FIG. 6C is an enlarged side view of a portion of an interior panel of an insulated door panel consistent with one embodiment of the invention.

Outer door panel 630 forms the exterior surface of a door for a cargo container. Outer door panel 630 may be constructed from any material suitable to form an exterior wall of a cargo container, such as metals, plastics, polymers, or any combination thereof. In one implementation, outer door panel 630 is a steel panel. As shown in FIG. 6C, outer door panel 630 may include side rails 632, top rail 634, mid-rail 642, bottom rail 654, vertical lock bolts 636, vertical lock bar 638, latch rods 640, horizontal lock bolts 648, horizontal lock bars 652, lock base 650, lock plate 644, and handle 646. These components form a latching and locking system for insulated door 600, however, any locking or latching system may be used. These components may be attached to outer door panel 630 using fasteners, adhesives, or welding. This implementation is merely exemplary and other implementations may also be used.

Figure 6D:
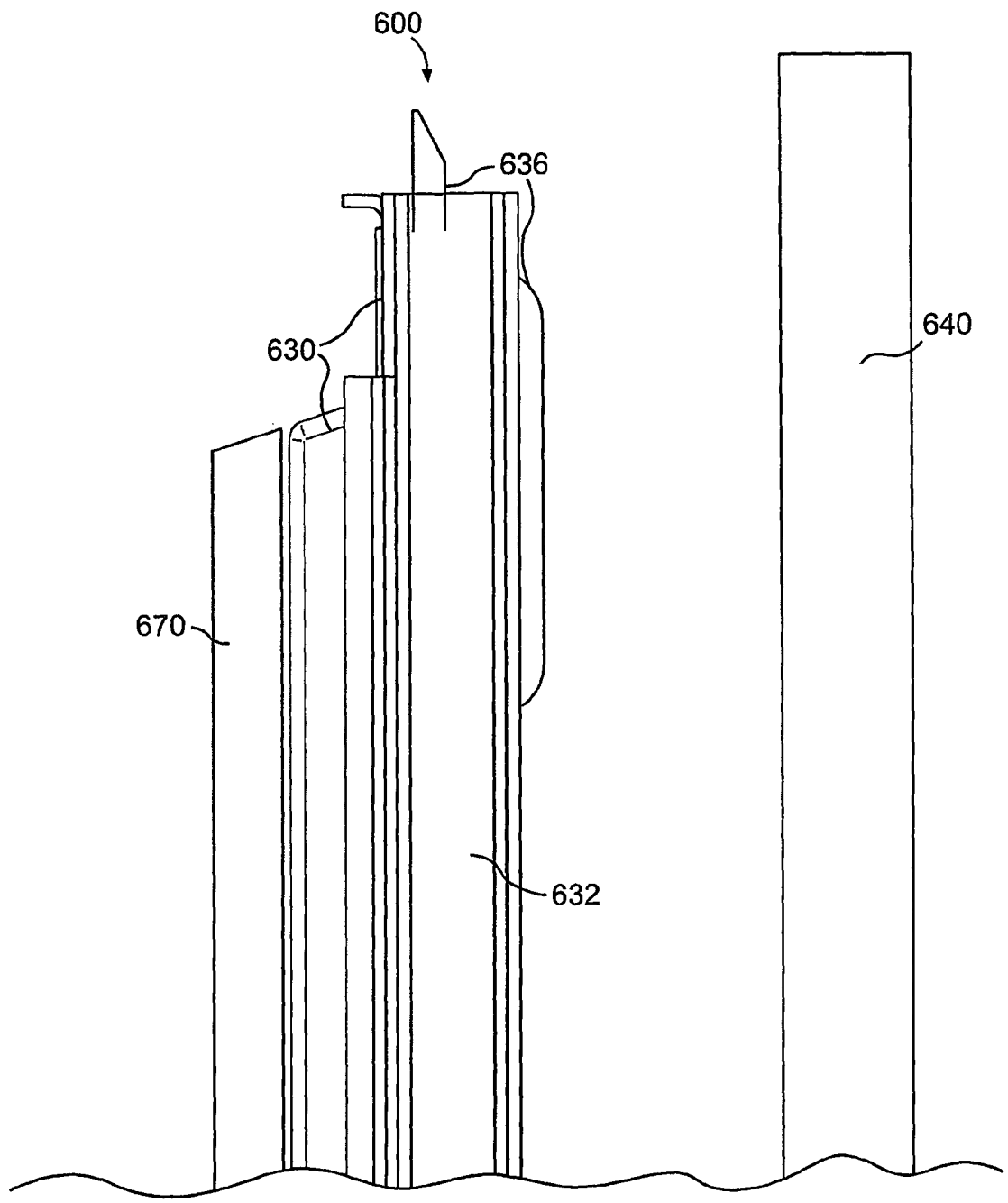
FIG. 6D is an enlarged side view of a portion of an insulated door panel with an interior panel removed consistent with one embodiment of the invention.
Figure 6E:
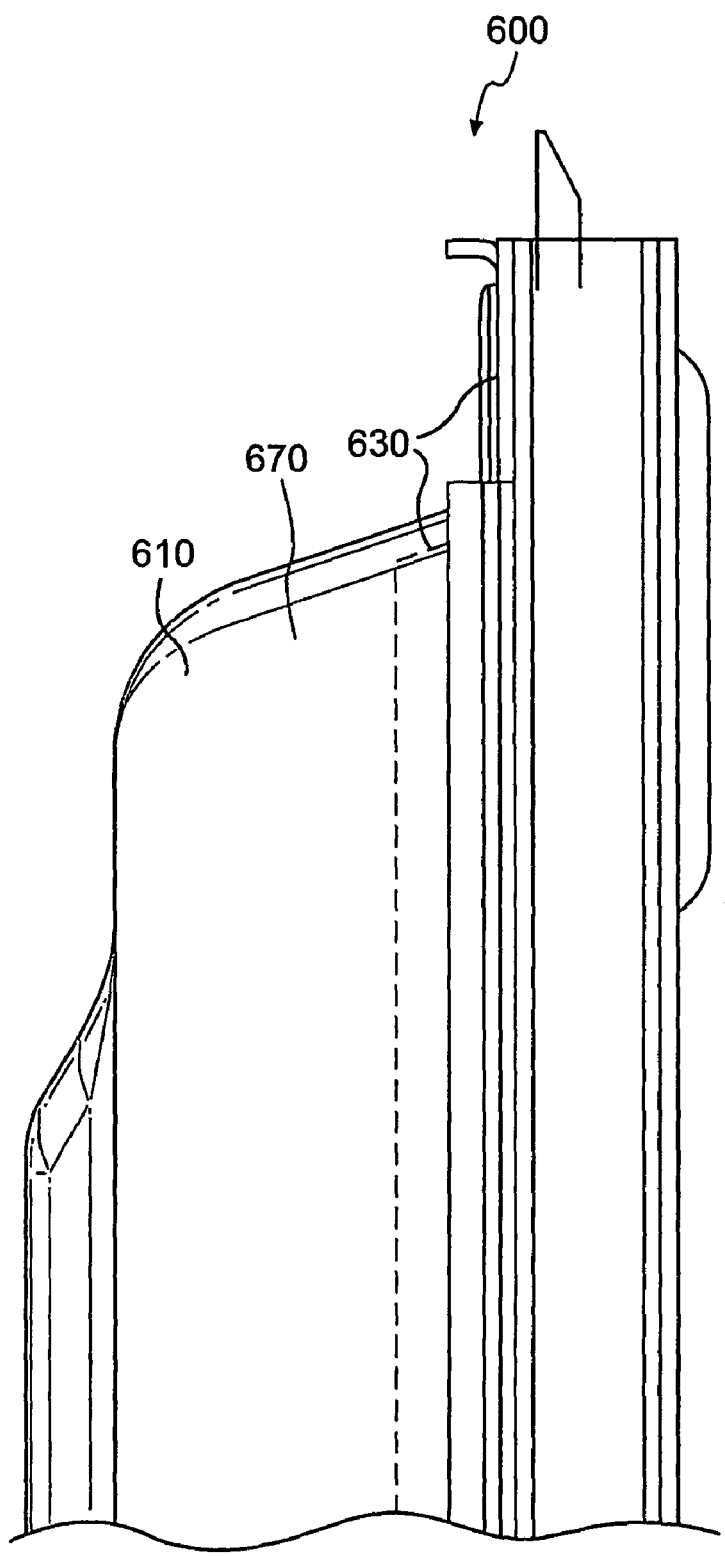
FIG. 6E is an enlarged side view of a portion of an insulated door panel consistent with one embodiment of the invention.
Figure 6F:
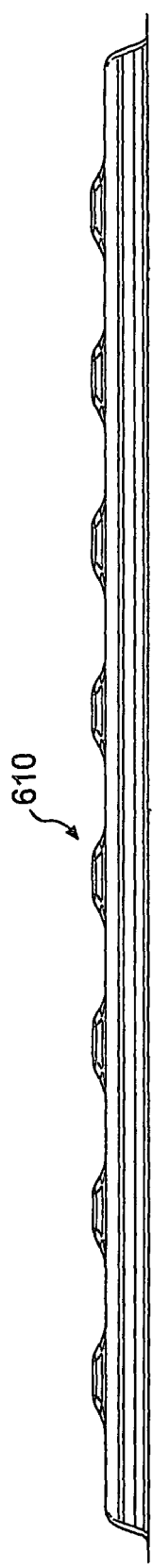
FIG. 6F is a top view of an interior panel of an insulated door panel consistent with one embodiment of the invention.
Figure 6G:
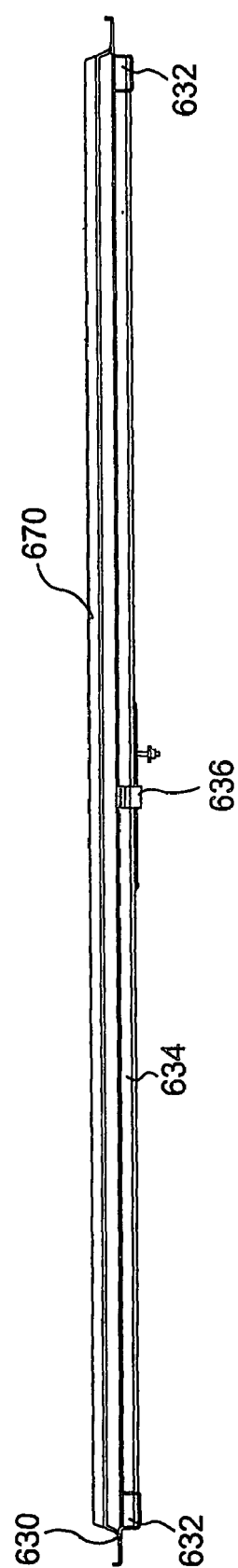
FIG. 6G is a top view of an insulated door panel with an interior panel removed consistent with one embodiment of the invention.
Figure 6H:
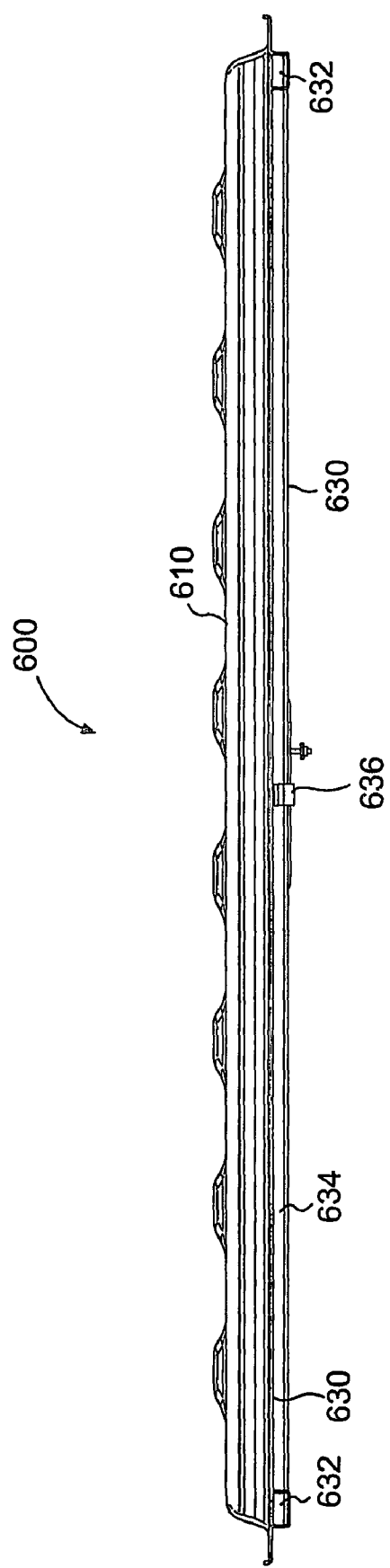
FIG. 6H is a top view of an insulated door panel consistent with one embodiment of the invention.
Figure 6I:
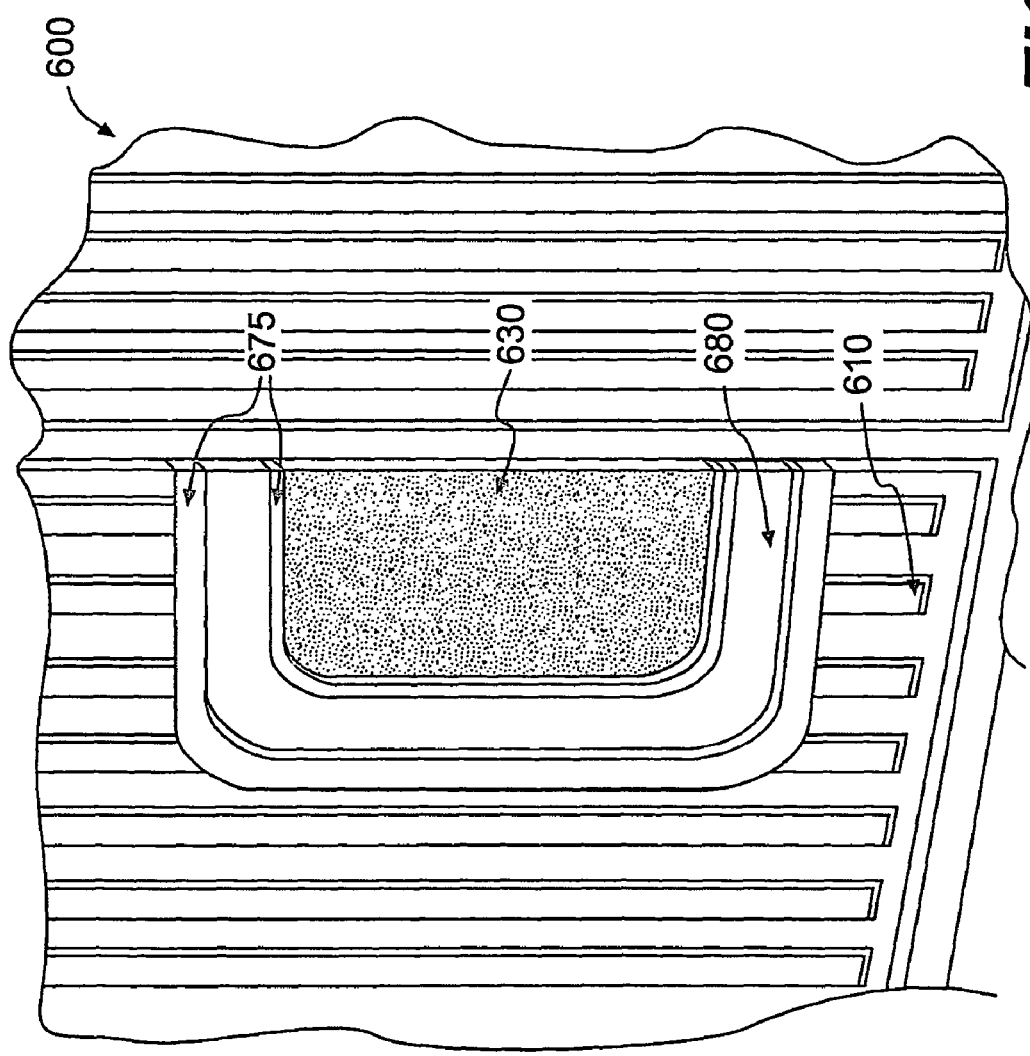
FIG. 6I is a interior cross-section of an insulated door panel consistent with one embodiment of the invention.

Side rails 632, top rail 634, mid-rail 642, and bottom rail 654 form a frame for a latching mechanism for outer door panel 630. As shown in FIGS. 6C-6E, side rails 632 are located on opposing ends of the exterior surface of outer door panel 630 extending vertically along the exterior surface. Top rail 634 is located at the top of outer door panel 630 between side rails 632 and oriented perpendicular to side rails 632. Mid-rail 642 is located at the center of outer door panel 630 between side rails 632 and oriented perpendicular to side rails 632. Bottom rail 654 is located at the bottom of outer door panel 630 between side rails 632 and oriented perpendicular to side rails 632. In one implementation, side rails 632, top rail 634, mid-rail 642, and bottom rail 654 are constructed of steel and are welded to outer door panel 630.

Vertical lock bolts 636, vertical lock bar 638, latch rods 640, horizontal lock bolts 648, horizontal lock bars 652, lock base 650, and lock plate 644 provide a latching mechanism for outer door panel 630. As shown in FIGS. 6C-6E, vertical lock bolts 636 are located on top rail 634 and bottom rail 654. In addition, lock base 650 and lock plate 644 are located on outer door panel 630. Handle 646 is located on lock base 650 to operate lock base 650. Vertical lock bar 638 extends vertically from the vertical lock bolt 636 on bottom rail 654 through lock plate 644 and into vertical lock bolt 636 on top rail 634. As further shown in FIGS. 6C-6E, horizontal lock bolts 648 are located on side rail 632. Horizontal lock bars 642 extend horizontally between the horizontal lock bolts 648. As also shown in FIGS. 6C-6E, latch rods 640 are oriented vertically and spaced apart from outer door panel 630. Lock plate 644 can be used to engage or disengage vertical lock bar 638, latch rods 640, and horizontal lock bars 652 to lock or unlock the door of a cargo container. This locking and latching mechanism is only exemplary, and any latching or locking mechanism may be used.

Insulation layer 670 increases the thermal efficiency of insulated door 600. As shown in FIG. 6D, insulation layer 670 is located on the interior surface of outer door panel 630. Insulation layer 670 may be attached to outer door panel 630 using fasteners or adhesive. In one implementation, a spray adhesive or a caulk adhesive, such as TremPro 650 is used. Insulation layer 670 may be constructed from any insulating material that will increase the thermal efficiency of insulated door 600. In one implementation, insulation layer 670 comprises a closed-cell polymer foam, such as urethane. In another implementation, insulation layer 670 comprises a vacuum insulated panel (described above). In yet another implementation (as shown in FIG. 6P), insulation layer 670 comprises a combination of foam and vacuum insulated panels. These implementations are merely exemplary, and other implementations may also be used.

As shown in FIGS. 6A-6I, interior panel 610 is placed over insulation layer 670 to form the interior surface of insulated door 600. Interior panel 610 may be attached to insulation layer 670 using fasteners or adhesives. In one implementation, a spray adhesive or a caulk adhesive, such as TremPro 650 is used. Interior panel 205 may be constructed from any material, such as metals, plastics, polymers, or any combination thereof, and in any shape suitable to form the interior wall of a cargo container. In one implementation, interior panel 205 is constructed from fiber-reinforced plastics. As shown in FIGS. 6A-6I, interior panel 610 may also include corrugations 620. Corrugations 620 allow for airflow on insulated door 600 to improve the thermal efficiency of insulated door 600. In one implementation, corrugations 620 include a series of trapezoidal shaped protrusions. In another implementation, interior panel 610 is flat and does not include corrugations. In yet another implementation a gasket (not shown) may also be located around the perimeter of door panel 600. These implementations are merely exemplary, and other implementations may also be used.

Figure 7B:
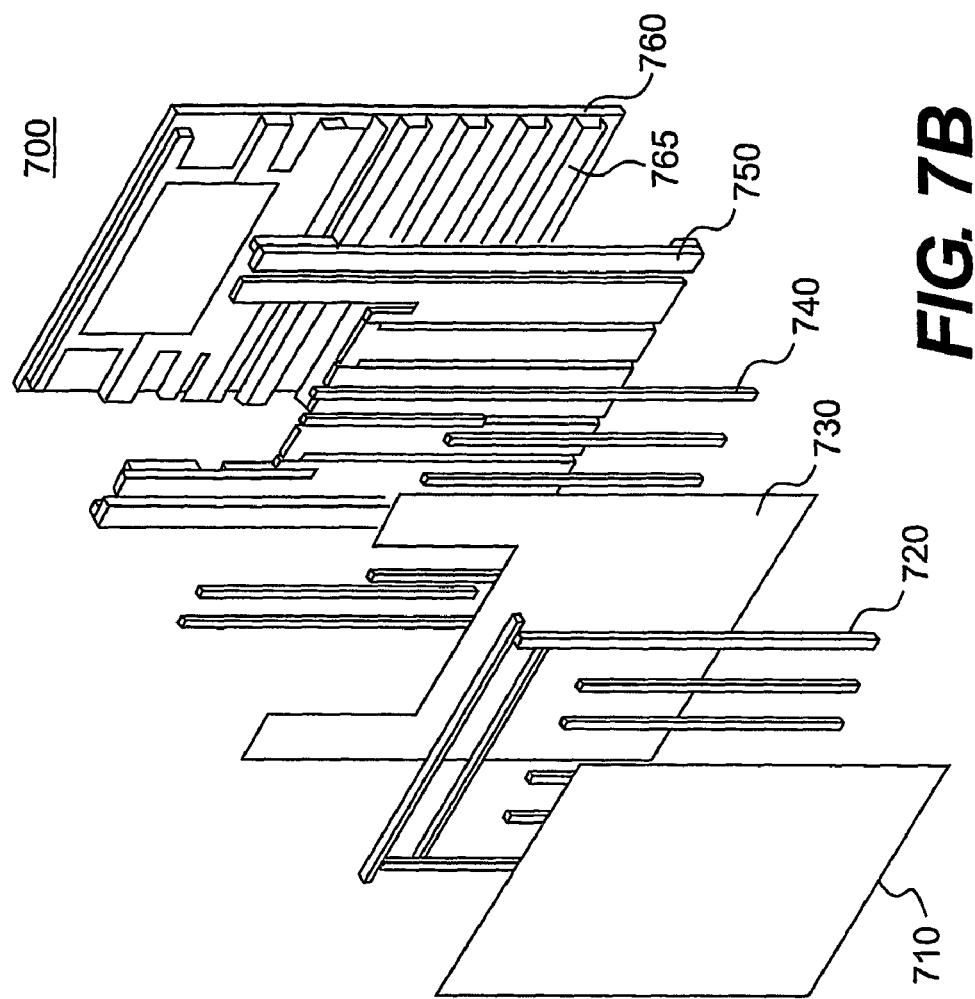
FIG. 7B is an exploded isometric view of an insulated end panel consistent with one embodiment of the invention.
Figure 7A:
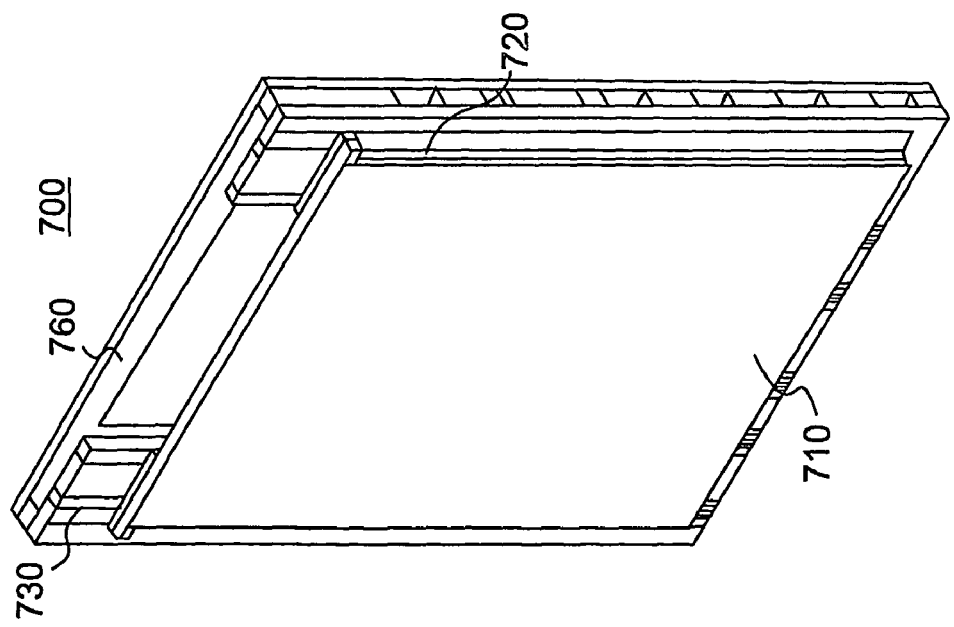
FIG. 7A is an isometric view of an insulated end panel consistent with one embodiment of the invention.

FIGS. 7A-7B are two views of an insulated end panel consistent with one embodiment of the invention. As shown in FIGS. 7A-7B, in one implementation, insulated end panel 700 includes an interior skin 710, structural members 720, a middle skin 730, structural members 740, an insulation layer 750, and exterior skin 760. Insulated end panels 700 may be used to form the end panel of an insulated boxcar, such as end panels 140 of FIG. 1. As shown in FIGS. 7A-7B, in one implementation, insulated end panel 700 includes a void to allow for insertion of a refrigeration unit. This implementation is merely exemplary, and other implementations may also be used.

Exterior skin 760 forms the exterior surface of a box car in which insulated end panel 700 is installed. Exterior skin 760 may be constructed from any material suitable to form an exterior wall of a cargo container, such as metals, plastics, polymers, or any combination thereof. In one implementation, exterior skin 760 is a galvanized steel panel. Exterior skin 760 may also be constructed of aluminum, stainless steel, or composite fiber-reinforced plastics. As shown in FIG. 7B, exterior skin 760 include channels 765 extending horizontally across exterior skin 760. Channels 765 provide structural support for insulated end panel 700. This implementation is merely exemplary, and other implementations may also be used.

As shown in FIGS. 7A-7B, insulation layer 750 is attached to exterior skin 760. Insulation layer 750 increases the thermal efficiency of insulated end panel 700. Insulation layer 750 may be attached to exterior skin 760 using fasteners or adhesives. In one implementation, a spray adhesive or a caulk adhesive, such as TremPro 650 is used. Insulation layer 750 may be constructed from any insulating material that will increase the thermal efficiency of insulated end panel 700. In one implementation, insulation layer 750 comprises a closed-cell polymer foam, such as urethane. In another implementation, insulation layer 750 comprises a vacuum insulated panel (described above). In yet another implementation, insulation layer 750 comprises a combination of foam and vacuum insulated panels. These implementations are merely exemplary, and other implementations may also be used.

As shown in FIGS. 7A-7B, structural members 740 are attached to insulation layer 750. Structural members 740 stiffen insulated end panel 700. Structural members 740 may be constructed in any shape and from any material suitable to provide structural support for insulated end panel 700, such as metals, plastics, polymers, or any combination thereof. In one implementation, structural members 740 are manufactured from steel and have a square cross-section. In this implementation, structural members 740 may be attached to indentations in insulation layer 750 using fasteners or adhesives. In one implementation, a spray adhesive or a caulk adhesive, such as TremPro 650 is used. This implementation is merely exemplary, and other implementations may also be used.

As shown in FIGS. 7A-7B, middle skin 730 is attached to structural members 740 and insulation layer 750. Middle skin 730 may be constructed from metals, plastics, polymers, or any combination thereof. In one implementation, middle skin 730 is a fiber-reinforced plastic liner. In this implementation, middle skin 730 is attached to structural members 740 and insulation layer 750 with fasteners or adhesives. In one implementation, a structural adhesive, such as Pliogrip 7700 and a spray adhesive or a caulk adhesive, such as TremPro 650 are used. This implementation is merely exemplary, and other implementations may also be used.

As shown in FIGS. 7A-7B, structural members 720 are attached to middle skin 730. Structural members 720 stiffen insulated end panel 700 and provide an avenue for air-flow. Structural members 720 may be constructed in any shape and from any material suitable to provide structural support for insulated end panel 700, such as metals, plastics, polymers, or any combination thereof. In one implementation, structural members 720 are manufactured from steel and have a square cross-section. In this implementation, structural members 720 may be attached to middle skin 730 with a spray adhesive or a caulk adhesive, such as TremPro 650. This implementation is merely exemplary, and other implementations may also be used.

As shown in FIGS. 7A-7B, interior skin 710 is attached to structural members 720 to form an integrated air plenum. The plenum allows for air-flow in insulated end panel 700, which improves the air temperature distribution of the boxcar. Interior skin 710 may be constructed from metals, plastics, polymers, or any combination thereof. In one implementation, interior skin 710 is a fiber-reinforced plastic. In this implementation, interior skin 710 is attached to structural members 720 with fasteners or adhesives. In one implementation, a structural adhesive, such as Pliogrip 7700 is used. This implementation is merely exemplary, and other implementations may also be used.

Figure 8B:
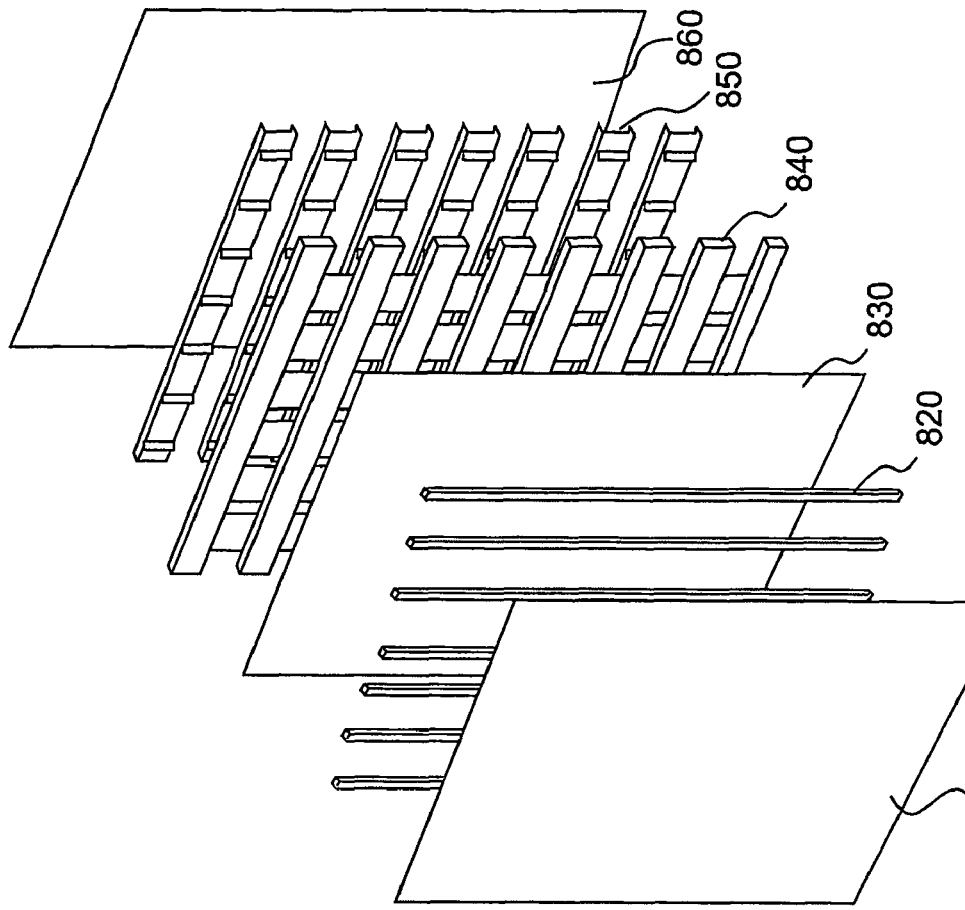
FIG. 8B is an exploded isometric view of an insulated end panel consistent with one embodiment of the invention.
Figure 8A:
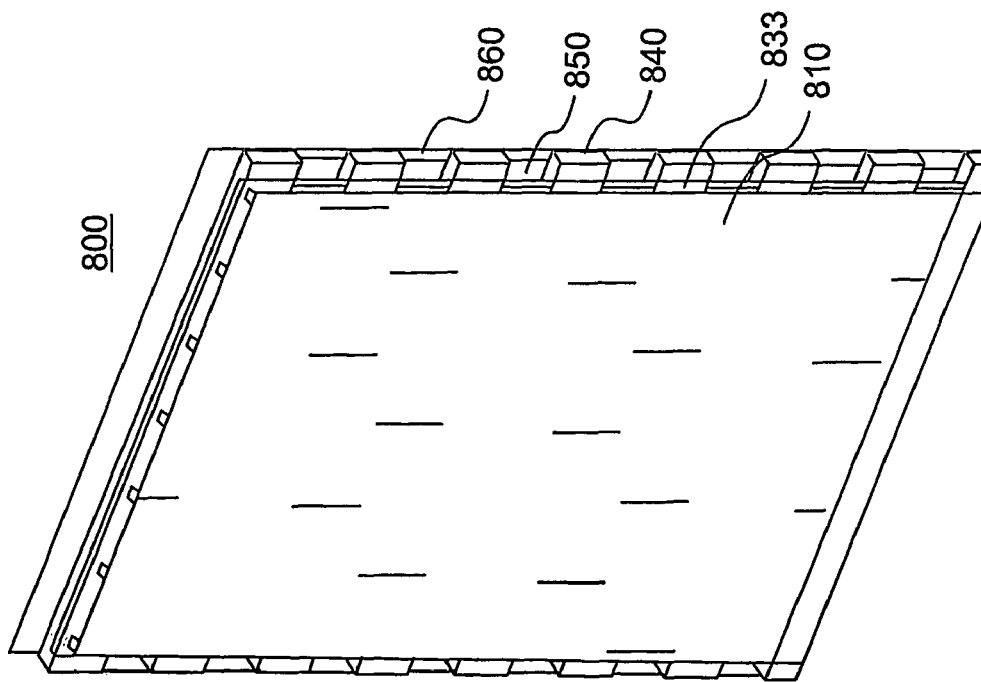
FIG. 8A is an isometric view of an insulated end panel consistent with one embodiment of the invention.

FIGS. 8A-8B are two views of an insulated end panel consistent with one embodiment of the invention. As shown in FIGS. 8A-8B, in one implementation, insulated end panel 800 includes an interior skin 810, structural members 820, a middle skin 830, an insulation layer 840, channels 850, and exterior skin 860. Insulated end panels 800 may be used to form the end panel of an insulated boxcar, such as end panels 140 of FIG. 1. This implementation is merely exemplary, and other implementations may also be used.

Exterior skin 860 forms the exterior surface of a boxcar in which insulated end panel 800 is installed. Exterior skin 860 may be constructed from any material suitable to form an exterior wall of a cargo container, such as metals, plastics, polymers, or any combination thereof. In one implementation, exterior skin 860 is a galvanized steel panel. Exterior skin 860 may also be constructed of aluminum, stainless steel, composite fiber-reinforced or polymers. This implementation is merely exemplary, and other implementations may also be used.

As shown in FIG. 8B, channels 850 are attached to exterior skin 860. Channels 850 provide structural support for insulated end panel 800. Channels 850 extend horizontally across exterior skin 860. Channels 850 may be constructed in any shape that allows for air-flow through end panel 800. In one implementation, channels 850 have a C-shaped cross-section. In addition, channels 850 may be constructed of metals, plastics, polymers, or any combination thereof. In one implementation, channels 850 are constructed of steel. In yet another implementation, channels 860 may be filled with an insulating foam, such as urethane. These implementations are merely exemplary, and other implementations may also be used.

As shown in FIGS. 8A-8B, insulation layer 840 is attached to exterior skin 860. Insulation layer 840 increases the thermal efficiency of insulated end panel 800. Insulation layer 840 may be attached to exterior skin 860 using fasteners or adhesives. In one implementation, a spray adhesive or a caulk adhesive, such as TremPro 650 is used. Insulation layer 840 may be constructed from any insulating material that will increase the thermal efficiency of insulated end panel 700. In one implementation, insulation layer 840 comprises a closed-cell polymer foam, such as urethane. In another implementation, insulation layer 840 comprises a vacuum insulated panel (described above). In yet another implementation, insulation layer 840 comprises a combination of foam and vacuum insulated panels. These implementations are merely exemplary, and other implementations may also be used.

As shown in FIGS. 8A-8B, middle skin 830 is attached to structural insulation layer 840. Middle skin 830 may be constructed from metals, plastics, polymers, or any combination thereof. In one implementation, middle skin 830 is a fiber-reinforced plastic liner. In this implementation, middle skin 830 is attached to insulation layer 840 with fasteners or adhesives. In one implementation, a spray adhesive or a caulk adhesive, such as TremPro 650 is used. This implementation is merely exemplary, and other implementations may also be used.

As shown in FIGS. 8A-8B, structural members 820 are attached to middle skin 830. Structural members 820 stiffen insulated end panel 800 and provide an avenue for air-flow. Structural members 820 may be constructed in any shape and from any material suitable to provide structural support for insulated end panel 700, such as metals, plastics, polymers, or any combination thereof. In one implementation, structural members 820 are manufactured from steel and have a square cross-section. In this implementation, structural members 820 may be attached to middle skin 830 using fasteners or adhesives. In one implementation, a spray adhesive or a caulk adhesive, such as TremPro 650 is used. This implementation is merely exemplary, and other implementations may also be used.

As shown in FIGS. 8A-8B, interior skin 810 is attached to structural members 820 to form an integrated air plenum. The plenum allows for air-flow in insulated end panel 800, which improves the air temperature distribution of the boxcar. Interior skin 810 may be constructed from metals, plastics, polymers, or any combination thereof. In one implementation, interior skin 810 is a fiber-reinforced plastic. In this implementation, interior skin 810 is attached to structural members 820 with fasteners or adhesives. In one implementation, a structural adhesive, such as Pliogrip 7700 is used. This implementation is merely exemplary, and other implementations may also be used.

FIGS. 2-8B described various components of a cargo container consistent with embodiments of the invention. It should be understood that cargo containers consistent with the invention may include any combination of the described insulated panels.

VI. CONCLUSION

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. An insulated floor system for a cargo container comprising:
    a bottom skin having a longitudinal axis and a top surface having a first end and a second end opposite said first end;
    a first side channel having a top surface and a bottom surface, wherein the bottom surface of the first side channel is attached to the top surface of the bottom skin at the first end and wherein the first side channel is aligned with the longitudinal axis of the bottom skin;
    a second side channel having a top surface and a bottom surface, wherein the bottom surface of the second side channel is attached to the top surface of the bottom skin at the second end and wherein the second side channel is aligned with the longitudinal axis of the bottom skin;
    at least one structural tube having a top and bottom surface, wherein the bottom surface of the structural tube is attached to the top surface of the bottom skin, and wherein the structural tube extends from the first side channel to the second channel and is aligned perpendicular with the longitudinal axis of the bottom skin;

at least one vacuum insulated panel having a top and bottom surface and having its bottom surface attached to the top surface of the bottom skin, wherein the vacuum insulated panel comprises:

an evacuated porous insulating material; and an air impermeable layer encapsulating the porous insulating material;

a top skin having a top and bottom surface, wherein the bottom surface of the top skin is attached to the top surfaces of the at least one vacuum insulated panel, the at least one structural tube, and the first and second side channels, and wherein the top skin and bottom skin form a closed structure surrounding the at least one vacuum insulated panel;

a support layer having a top and bottom surface and having its bottom surface attached to the top surface of the top skin; and a tread plate sheet having a bottom surface and having its bottom surface attached to the top surface of the support layer.

2. The insulated floor system of claim 1, wherein the first and second side channels have a C-shaped cross section.

3. The insulated floor system of claim 2, wherein an insulation foam block is disposed on the first and second side channels.

4. The insulated floor system of claim 1, wherein the first and second side channels are fiber-reinforced plastic side channels.

5. The insulated floor system of claim 1, wherein the at least one structural tube is a fiber-reinforced plastic tube.

6. The insulated floor system of claim 1, wherein the porous insulating material comprises an open-cell foam core material.

7. The insulated floor system of claim 6, wherein the open-cell foam core material comprises a micro-cellular, open-cell polystyrene foam.

8. The insulated floor system of claim 1, wherein the porous insulating material comprises a fine fiberglass web core material.

9. The insulated floor system of claim 1, wherein the air impermeable layer comprises a metal-coated polymer film.

10. The insulated floor system of claim 1, further comprising a foam insulation layer between the bottom skin and the top skin.

11. An insulated roof system for a cargo container comprising:

a roof plate having a bottom surface and first and second opposing ends of the bottom surface;

an exterior skin having a top and bottom surface and having its top surface attached to the bottom surface of the roof plate;

a first support member attached to the bottom surface of the roof plate at the first end;

a second support member attached to the bottom surface of the roof plate at the second end;

at least one vacuum insulated panel having a top and bottom surface and having its top surface attached to the bottom surface of the exterior skin, wherein the vacuum insulated panel comprises:

an evacuated porous insulating material; and an air impermeable layer encapsulating the porous insulating material;

an interior skin having a top and bottom surface and having its top surface attached to the bottom surface of the at least one vacuum insulated panel, and wherein the bottom surface has a first end and a second end opposite said first end and a longitudinal axis;

a first hanger attached to the first support member and attached to the bottom surface of the interior skin at the first end;

a second hanger attached to the second support member and attached to the bottom surface of the interior skin at the second end;

at least one collapsible member having a top surface and a bottom surface, and having its top surface attached to the bottom surface of the interior skin; and a bottom sheet having a top surface attached to the bottom surface of the at least one collapsible member, wherein the interior skin, at least one collapsible member, and bottom sheet form a plenum.

12. The insulated roof system of claim 11, wherein the exterior skin is a fiber-reinforced plastic skin.

13. The insulated roof system of claim 11, wherein the porous insulating material comprises an open-cell foam core material.

14. The insulated roof system of claim 13, wherein the open-cell foam core material comprises a micro-cellular, open-cell polystyrene foam.

15. The insulated roof system of claim 11, wherein the porous insulating material comprises a fine fiberglass web core material.

16. The insulated roof system of claim 11, wherein the air impermeable layer comprises a metal-coated polymer film.

17. The insulated roof system of claim 11, further comprising a foam insulation layer between the exterior skin and the interior skin.

18. The insulated roof system of claim 11, wherein the interior skin is a fiber-reinforced plastic skin.

19. The insulated roof system of claim 11, wherein the at least one collapsible member has a Z-shaped cross-section.

* * * * *

UNITED STATES PATENT AND TRADEMARK OFFICE
CERTIFICATE OF CORRECTION

| | | |
|---|---|---|
| PATENT NO. | : 7,748,172 B2 | Page 1 of 1 |
| APPLICATION NO. | : 10/545235 | |
| DATED | : July 6, 2010 | |
| INVENTOR(S) | : Zupancich et al. | |

It is certified that error appears in the above-identified patent and that said Letters Patent is hereby corrected as shown below:

Title page, item (73), line 1,

"Assignee: Martin Marietta Materials, IInc.," should read
-- Assignee: Martin Marietta Materials, Inc., --

Signed and Sealed this

Seventh Day of September, 2010

David J. Kappos
*Director of the United States Patent and Trademark Office*